United States Patent
Kanamaru et al.

[11] Patent Number: 5,954,025
[45] Date of Patent: Sep. 21, 1999

[54] CONTROL APPARATUS, FOR INTERNAL COMBUSTION ENGINE, FOR IMPROVING STABILITY OF AN IDLE STATE OF THE ENGINE

[75] Inventors: Masanobu Kanamaru; Kunihiko Nakata, both of Mishima; Yasuyuki Irisawa; Yoshiaki Atsumi, both of Susono, all of Japan

[73] Assignee: Toyota Jidosha Kabushiki Kaisha, Aichi-ken, Japan

[21] Appl. No.: 09/108,939

[22] Filed: Jul. 1, 1998

[30] Foreign Application Priority Data

Jul. 31, 1997 [JP] Japan ................................ 9-206855

[51] Int. Cl.$^6$ .................................... F02M 51/02
[52] U.S. Cl. ................ 123/339.11; 123/339.24; 123/406.53; 123/179.16; 123/491
[58] Field of Search .............. 123/1 A, 339.11, 123/339.24, 406.53, 491, 179.16

[56] References Cited

U.S. PATENT DOCUMENTS

| | | | |
|---|---|---|---|
| 4,463,732 | 8/1984 | Isobe et al. | 123/492 |
| 5,033,439 | 7/1991 | Eygret | 123/491 |
| 5,542,388 | 8/1996 | Ichinose et al. | 123/336 |

FOREIGN PATENT DOCUMENTS

| | | |
|---|---|---|
| 60-27760 | 2/1985 | Japan . |
| 61-82050 U | 5/1986 | Japan . |
| 2-64250 | 3/1990 | Japan . |
| 3-23342 | 1/1991 | Japan . |

OTHER PUBLICATIONS

Journal of technical disclosure of Japan Institute of Invention and Innovation, Jul. 1, 1996.

*Primary Examiner*—Tony M. Argenbright
*Assistant Examiner*—Mahmoud M. Gimie
*Attorney, Agent, or Firm*—Kenyon & Kenyon

[57] ABSTRACT

An engine control apparatus is disclosed, in which the combustion instability is improved regardless of the type of fuel supplied to the engine so that the idle state immediately after an engine start is stabilized for improving the fuel consumption rate, preventing the deterioration of emission and thereby improving the durability of catalysts. A counter counts the time elapsed from an engine start. A sensor detects the engine speed. A control circuit controls the timing of fuel injection into the engine. The intake-synchronous injection is carried out during a first predetermined time immediately after a cold engine start. The intake-asynchronous injection is carried out after the lapse of the first predetermined time. During the intake-asynchronous injection, the engine speed is monitored to determine whether it is reduced below a reference engine speed until the lapse of a second predetermined time. In the case where the engine speed is reduced below the reference engine speed, the intake-synchronous injection is temporarily carried out and the engine speed is increased for stabilizing the idle state. The control apparatus can store the idling characteristic for cold engine start for each type of fuel supplied so that temporary intake-synchronous injection may be carried out only for the heavy fuel.

48 Claims, 15 Drawing Sheets

| PERIOD<br>FUEL | P 1 | P 2 | P 3 |
|---|---|---|---|
| LF | INTAKE-SYNC INJECTION | INTAKE-ASYNC INJECTION | INTAKE-ASYNC INJECTION |
| HF 1 | INTAKE-SYNC INJECTION | INTAKE-ASYNC INJECTION | INTAKE-SYNC INJECTION |
| HF 2 | INTAKE-ASYNC INJECTION | INTAKE-ASYNC INJECTION | INTAKE-ASYNC INJECTION |

CONTROL APPARATUS, FOR INTERNAL COMBUSTION ENGINE, FOR IMPROVING STABILITY OF AN IDLE STATE OF THE ENGINE

BACKGROUND OF THE INVENTION

1. Field of the Invention

The present invention relates to a control apparatus for an internal combustion engine or, in particular, to a control apparatus, for an internal combustion engine, aimed at improving the stability of the idle state by improving the combustion immediately after a cold start of the engine.

2. Description of the Related Art

Conventionally, the fuel injection amount and the fuel injection timing of an internal combustion engine (hereinafter referred to simply as "the engine") are determined by the engine load which in turn is determined based on the intake air amount of the engine and the engine speed. The fuel injection timing is set generally at a time point before the intake valve of each cylinder opens, except at a transient time when the load undergoes a sudden change. This fuel injection is called intake-asynchronous injection.

In this conventional technology, however, the fuel injected in an intake-asynchronous mode at the time of an engine start, especially, at the time of an engine cold start, sometimes fails to vaporize, attaches to the surface of the intake pipe and is undesirably supplied to each cylinder in liquid form. In such a case, the problem of a deteriorated emission is caused by the increase of such components as CO and HC in the exhaust gas.

To prevent this inconvenience, Unexamined Patent Publication No. 3-23342 and Unexamined Utility Model Publication No. 61-82050 propose a method of preventing the deterioration of the combustion and hence the deterioration of the emission by injecting the fuel synchronously with the intake timing when starting the engine at a low temperature. The intake-synchronous injection is defined as synchronizing the fuel injection timing with the opening of the intake valve of the cylinder into which the fuel is to be injected.

According to the technology disclosed in Unexamined Patent Publication No. 3-23342 and Unexamined Utility Model Publication No. 61-82050, the engine is always switched to the intake-synchronous injection at the time of a cold start. In the case where the switching to the intake-asynchronous injection is not required, such as when the engine is in satisfactory combustion state, however, the emission (exhaust HC) is undesirably increased. This is because, in intake-synchronous injection, the fuel is generally supplied to the combustion chamber in a state not mixed well with the intake air, and the delayed fuel atomization results in an increased amount of emission.

On the other hand, the current trend is toward the practice of changing the components of the gasoline constituting the fuel from one season to another. Specifically, the practice is spreading to supply a light fuel having a superior combustion property in winter when the temperature is low and to supply a heavy fuel, which is hard to vaporize, in summer when the temperature is high. An engine, which remains in the intake-asynchronous injection mode but not in the intake-synchronous injection mode at the time of cold start, may fail to start when supplied with a heavy fuel. The conventional practice, therefore, is to effect the intake-synchronous injection for a predetermined length of time at the time of cold start in order that the engine can be always started regardless of the fuel type. In the case where the intake-synchronous injection is always effected for a predetermined length of time at the time of cold start of an engine supplied with light fuel, however, the emission is deteriorated at the cold start time as described above.

SUMMARY OF THE INVENTION

Accordingly, it is an object of the invention to provide an engine control apparatus capable of improving the unstable combustion and thereby improving the fuel consumption, while at the same time preventing the damage to the catalyst by preventing a misfire regardless of the type of fuel supplied to the engine.

In order to achieve the object of the invention, according to a first aspect of the invention, there is provided an engine control apparatus comprising means for counting the time elapsed after an engine start, means for detecting an idle stability (idle roughness) after an engine start, and means for controlling the timing of fuel injection into the engine, wherein the fuel injection timing control means includes a first intake-synchronous injection means for executing the intake-synchronous injection for a first predetermined time immediately following engine start, means for executing the intake-asynchronous injection after the lapse of the first predetermined time and a second intake-synchronous injection means for executing the intake-synchronous injection temporarily in the case where the idle stability of the engine is adversely affected before the lapse of the second predetermined time after the first predetermined time to thereby assure the idle stability immediately following the cold start of the engine.

The idle stability detector determines that the idle stability of the engine is not satisfactory in the case where the engine speed is lower than a reference speed, in the case where the reduction in engine speed is not less than a predetermined value, in the case where the intake pipe pressure is not less than a predetermined value or in the case where the increase in the intake pipe pressure is not less than a predetermined value.

In order to achieve the above-mentioned object, according to a second aspect of the invention, there is provided an engine control apparatus comprising means for measuring the time elapsed after an engine start, means for storing the idle characteristic after a cold engine start for each of the light fuel and the heavy fuel supplied to the engine, and means for controlling the timing of fuel injection into the engine, wherein the fuel injection timing control means includes first intake-synchronous injection means for executing the intake-synchronous injection for a predetermined first time immediately after an engine start, intake-asynchronous injection means for executing intake-asynchronous injection after the lapse of said first predetermined time, and second intake-synchronous injection means for executing the intake-synchronous injection temporarily in the case where the idling characteristic of the engine exhibits the idling characteristic for heavy fuel before the lapse of the second predetermined time following the lapse of the first predetermined type thereby to improve the idle stability of the engine immediately after cold start.

The idling characteristic associated with heavy fuel concerns the case in which the engine speed is reduced below a reference speed by not less than a predetermined amount before the lapse of a second predetermined time after the lapse of a first predetermined time, or the case in which the intake pipe pressure is increased to not less than a predetermined value by a predetermined amount.

In order to achieve the above-mentioned object, according to a third aspect of the invention, there is provided an engine control apparatus comprising means for measuring the time elapsed after an engine start, means for detecting the idle stability after an engine start, and means for controlling the ignition timing of the engine, wherein the ignition timing control means includes first advancing means for advancing the ignition timing only for a predetermined time immediately following engine start, first ignition timing restoration means for restoring the ignition timing to the base ignition timing after the lapse of the first predetermined time, and second advancing means for advancing the ignition timing from the base ignition timing temporarily in the case where the idle stability of the engine is deteriorated after the lapse of a first predetermined time before the lapse of a second predetermined time, thereby stabilizing the idling characteristic immediately after cold start of the engine.

In order to achieve the above-mentioned object, according to a fourth aspect of the invention, there is provided an engine control apparatus comprising means for measuring the time elapsed after an engine start, means for detecting the idle stability after an engine start, means for controlling the ignition timing of the engine, and means for controlling the fuel injection amount, in which the ignition timing control means includes advancing means for advancing the ignition timing for a first predetermined time immediately following engine start, and ignition timing restoration means for restoring the ignition timing to the base ignition timing temporarily after the lapse of the first predetermined time, and in which the fuel injection amount control means includes means for increasing the fuel amount temporarily in the case where the idle stability of the engine is deteriorated before the lapse of a second predetermined time after the lapse of the first predetermined time thereby to secure the idle stability immediately after a cold engine start.

Further, in order to achieve the above-mentioned object, according to a fifth aspect of the invention, there is provided an engine control apparatus comprising means for measuring the time elapsed after an engine start, storage means for storing the idle characteristics after a cold engine start for each of the light fuel and the heavy fuel supplied to the engine, and ignition timing control means for controlling the ignition timing of the engine, wherein the ignition timing control means includes first advancing means for advancing the ignition timing for a first predetermined time immediately after an engine start, first ignition timing restoration means for restoring the ignition timing to the base ignition timing after the lapse of the first predetermined time, and second advancing means for advancing the ignition timing temporarily from the base ignition timing in the case where the engine idling characteristic exhibits a characteristic associated with heavy fuel after the lapse of the first predetermined time before the lapse of a second predetermined time thereby to secure the idle stability immediately after a cold engine start.

Furthermore, in order to achieve the above-mentioned object, according to a sixth aspect of the invention, there is provided an engine control apparatus comprising means for measuring the time elapsed after an engine start, storage means for storing the idling characteristic after a cold engine start for each of light fuel and heavy fuel supplied to the engine, means for controlling the ignition timing of the engine, and means for controlling the fuel injection amount, wherein the ignition timing control means includes means for advancing the ignition timing for a first predetermined time immediately following engine start and means for restoring the ignition timing to the base ignition timing after the lapse of the first predetermined time, and wherein the fuel injection amount control means includes means for increasing the fuel injection amount temporarily in the case where the idling characteristic for heavy fuel is exhibited after the lapse of the first predetermined time before the lapse of a second predetermined time to thereby secure the idle stability immediately after cold start of the engine.

According to the first and second aspects of the invention, the engine speed is secured by carrying out the intake-synchronous injection for a very short time at the time of cold start of the engine, followed by the intake-asynchronous injection. Further, the idling stability is monitored immediately after an engine start, and in the case where the idle stability is deteriorated within a predetermined time after an engine start, the intake-synchronous injection is introduced. After that, the intake-synchronous injection is continued for a predetermined time, followed again by restoring the intake-asynchronous injection. As a result, the fuel combustion instability can be improved and the deterioration of the emission prevented regardless of the type of fuel supplied to the engine.

According to the third and fifth aspects of the invention, the engine speed is secured by advancing the ignition timing only for a very short time at the time of cold start of the engine, followed by being restored to the base ignition timing. Immediately after an engine start, the idling stability is monitored, and if the idle stability is deteriorated within a predetermined time of engine start, the ignition timing is advanced. After that, the ignition timing is kept advanced for a predetermined time, followed again by being restored to the base ignition timing. As a result, the combustion instability can be improved and the deterioration of the emission prevented regardless of the type of fuel supplied to the engine.

According to the fourth and sixth aspects of the invention, the engine speed is secured by advancing the ignition timing for a very short time at the time of cold start of the engine, followed by being restored to the base ignition timing. Immediately after an engine start, the idle stability is monitored, and in the case where the idle stability is deteriorated within a predetermined time after an engine start, the fuel injection amount is increased. After that, the fuel injection amount is increased for a predetermined time, and then the base injection amount is restored. As a result, the combustion instability can be improved and the deterioration of the emission can be prevented regardless of the type of fuel supplied to the engine.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Specific embodiments of the invention will be explained in detail below with reference to the accompanying drawings.

Figure 1:
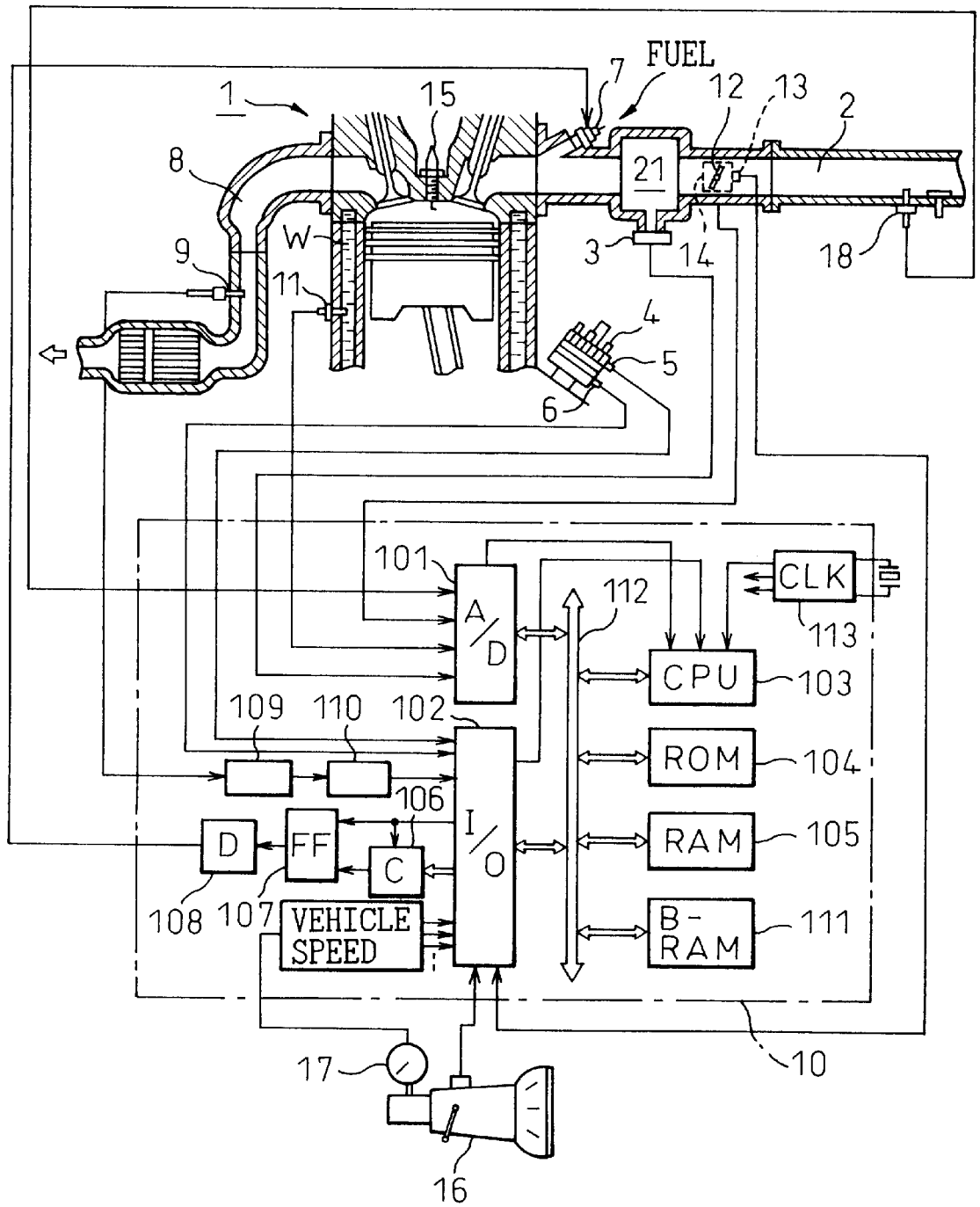
FIG. 1 is a diagram showing a general configuration of an electronically-controlled engine having an engine control apparatus according to the invention.

FIG. 1 schematically shows an electronically-controlled fuel injection engine 1 having an engine control apparatus according to the invention.

In FIG. 1, reference numeral 2 designates an intake path, the inlet of which is provided with an intake air temperature sensor 18 for detecting the temperature of the intake air. Numeral 12 designates a throttle valve operatively interlocked with an accelerator pedal (not shown) for regulating the amount of intake air sucked into the combustion chamber of the engine. The throttle valve 12 opens when the engine is in idle state, and increases the opening thereof with the engine load. The throttle valve 12 has a potentiometer 14 built therein to output a voltage proportional to the opening thereof. Also, the throttle valve 12 is provided with an idle switch 13 for detecting the closed-up state of the throttle valve 12. The potentiometer 14 is connected to an A/D converter 101 described later, and the idle switch 13 is connected to an input/output (I/O) interface 102.

A surge tank 21 located downstream of the throttle valve 12 is provided with a pressure sensor 3 for detecting the intake pressure in the surge tank 21. This pressure sensor 3 includes a semiconductor sensor or the like using a silicon film for generating a potential difference due to strain proportional to pressure, for example. A pressure signal is produced as a potential difference proportional to the absolute pressure. This pressure signal is applied to the A/D converter 101 with a built-in multiplexer in a control circuit 10 described later.

A fuel injection valve 7 is provided for each cylinder and, upon energization, it opens and supplies pressured fuel to the intake port from a fuel supply system not shown. A distributor 4 is connected with crank angle sensors 5, 6. The crank angle sensor 6 outputs a reference position detection pulse per crank angle of 30° (30° CA), for example. The crank angle sensor 5, on the other hand, outputs a pulse at a reference position for every rotation of the distributor shaft, i.e. for every two rotations of the engine (720° CA) thereby to identify a cylinder of the engine. The pulse signals from these crank angle sensors 5, 6 are applied to the input/output interface 102 of the control circuit 10. In particular, the output from the crank angle sensor 6 is applied to the interrupt terminal of a CPU 103.

A water temperature sensor 11 using a thermistor is arranged in the cooling water path W of the cylinder block of the engine 1 for detecting the temperature THW of the cooling water and generating an analog voltage proportional to the engine water temperature. The signal from this water temperature sensor 11 is also supplied to the A/D converter 101 of the control circuit 10.

Further, an $O_2$ sensor 9 is arranged in the exhaust path 8 for generating an electrical signal corresponding to the concentration of the oxygen component of the exhaust gas. The output of the $O_2$ sensor 9 is applied through a buffer circuit 109 and a comparator circuit 110 of the control circuit 10 to the input/output interface 102.

The control circuit 10 is configured of a microcomputer, for example, and, in addition to the A/D converter 101, the input/output interface 102, the CPU 103, the buffer circuit 109 and the comparator 110 described above, includes a ROM 104, a RAM 105, a backup RAM 111 and a bus 112 for connecting these components. Also, the control circuit 10 includes a down counter 106, a flip-flop 107 and a drive circuit 108 for controlling a fuel injection valve 7. Specifically, the fuel injection amount TAU, once calculated, is preset in the down counter 106 and set in the flip-flop 107 at the same time. As a result, the drive circuit 108 begins to activate the fuel injection valve 7. When the down counter 106 counts the clock signal from a clock (CLK) circuit 113 and outputs a "1" signal from the carry-out terminal thereof, the flip-flop 107 is reset so that the drive circuit 108 de-activates the fuel injection valve 7. In other words, the fuel injection valve 7 is activated to the extent corresponding to the fuel injection amount TAU, and therefore the fuel corresponding to the fuel injection amount TAU is sent into the combustion chamber in the engine body 1. The CPU 103 is interrupted at the end of A/D conversion in the A/D converter 101, upon receipt of a pulse signal from the crank angle sensor 6 by the input/output interface 102, etc.

The control circuit 10 is also supplied with a detection signal from a vehicle speed sensor 17 or the like arranged on a speed meter cable connected with a transmission 16 and a shift position signal indicating the shift position of the transmission 16. The control circuit 10 outputs an ignition signal to an ignitor built in the distributor 4 whereby the energization of the spark plug 15 is controlled.

The detection signal representing the intake air amount data of the pressure sensor 3 and the cooling water temperature data THW are converted into a binary signal by an A/D conversion routine executed at predetermined time intervals. At each time of this conversion, a predetermined area in the RAM 105 is updated and new data is stored therein.

Now, the operation of the control circuit 10 of the engine 1 having the above-mentioned configuration will be explained with reference to a flowchart.

Figure 2:
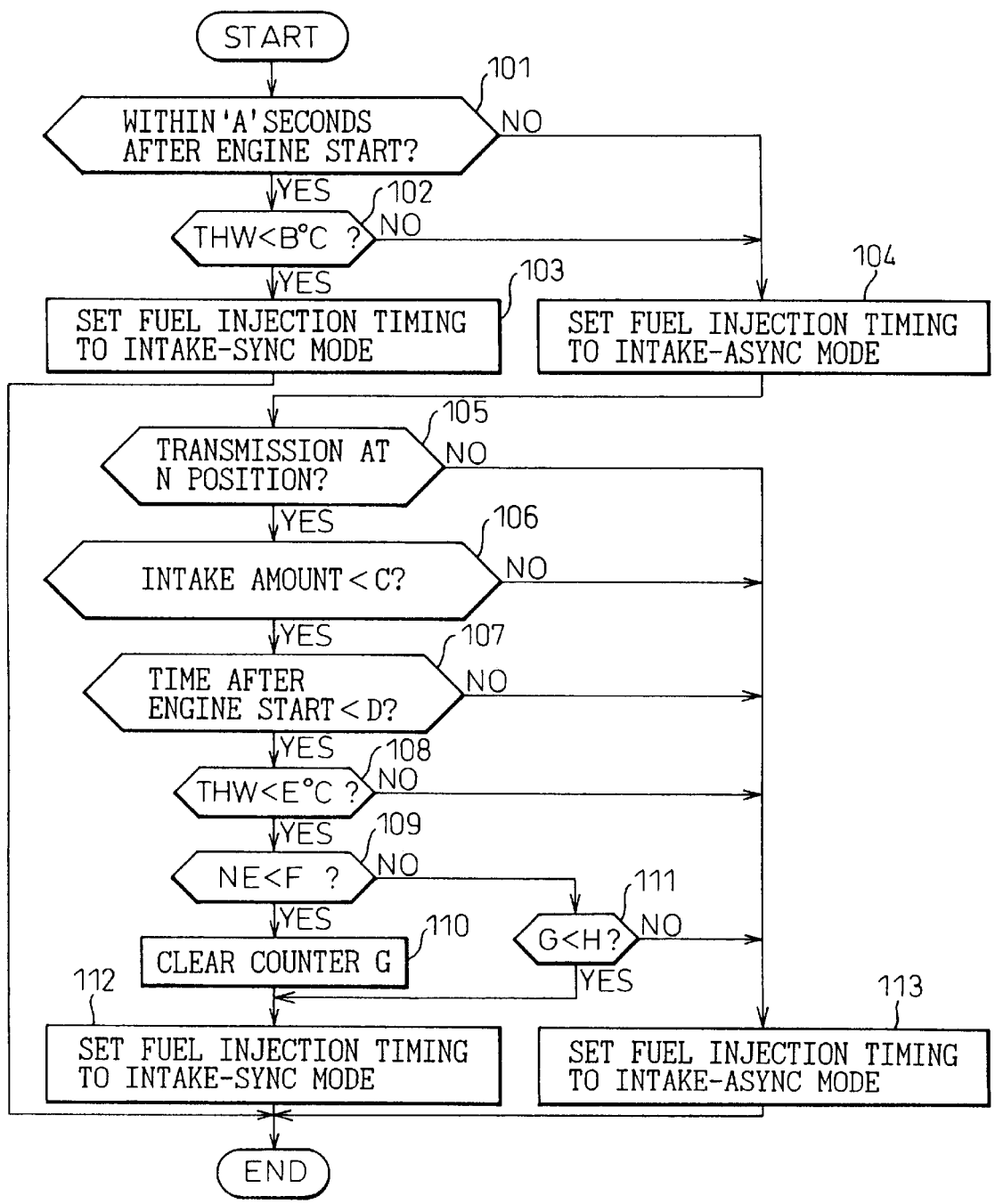
FIG. 2 is a flowchart showing the steps of control by the engine control apparatus at the time of engine start according to a first embodiment of the invention.

FIG. 2 is a flowchart showing the steps of control by the engine control apparatus at the time of engine start according to a first embodiment of the invention. These steps are executed at predetermined time intervals, say, 8 ms.

With the start of the engine 1, it is determined at step 101 whether the time following the engine start has passed a predetermined time length of A seconds. This A seconds time length is set to about one second. In the case where the time after starting the engine is not longer than A seconds, control proceeds to step 102 for determining whether the cooling water temperature THW indicating the engine temperature is lower than a predetermined temperature B °C. or not. This B °C. is about 40° C. If it is determined that THW<B at step 102, the engine is judged to be in cold state and to have not completed the warm-up. Control proceeds to step 103 where the fuel injection timing is set to intake-synchronous mode and ends the routine. In the intake-synchronous injection, fuel is injected from the fuel injection valve and enters a cylinder when the intake valve of the particular cylinder is open.

In the case where it is determined at step 101 that A seconds has passed after an engine start or in the case where it is determined at step 102 that THW≧B and that the engine is completely warmed up, then control proceeds to step 104, where the fuel injection is set to intake-asynchronous mode. In this intake-asynchronous injection, fuel is injected when the intake valve of the cylinder into which the fuel is to be injected is closed.

Experiments show that the idle stability after an engine start is affected to a large measure by the combustion state immediately after an engine start. If the combustion is set in superior state in the initial stage of engine starting, subsequent combustion state restoration means is not needed. It has been found that in the case where the combustion state of the engine is not satisfactory from the beginning of engine start, in contrast, subsequent restoration of a satisfactory combustion state requires a complicated restoration process such as increasing the fuel amount, advancing the ignition timing, etc. According to the first embodiment, therefore, the fuel injection timing is set to intake-synchronous mode to secure an idle stability during the predetermined A seconds after cold starting of the engine.

After setting the fuel injection timing to the intake-asynchronous mode in this way, control proceeds to step 105 for determining whether or not the shift position of the transmission 16 is neutral N. In the case where the shift position is neutral N, control proceeds to step 106 for determining whether the intake amount (intake air amount) is less than a predetermined value C or not. This intake amount can be calculated from the detection value of the pressure sensor 3. In the case where the intake amount <C at step 106, control proceeds to step 107. The reason why the intake amount is compared at step 106 is because the combustion is liable to lose stability more under a light load (with a small intake amount) than under a heavy load (with a large intake amount).

At step 107, it is determined whether or not a predetermined time D longer than A seconds has elapsed after an engine start. In the case where the time that has elapsed after an engine start is shorter than D, control proceeds to step 108 for determining again whether the cooling water temperature THW of the engine is lower than E °C. which is higher than B °C. described above. At this time, the cooling water temperature THW should be about 45° C.

At next step 109, it is determined whether or not the engine speed NE is lower than a predetermined value F. The predetermined engine speed F is about 1000 rpm. In the case where it is determined at step 109 that NE is smaller than F, control proceeds to step 110, where the count on a free-run counter G is cleared. After the count on the counter G is cleared, control proceeds to step 112 for setting the fuel injection timing to intake-synchronous mode, thus ending the routine.

As described above, according to the first embodiment, it is determined that the combustion is unstable and the idle stability is deteriorated from the fact that the engine speed NE is reduced below the predetermined value F, in the case where the shift position of the transmission is neutral N, the intake amount is smaller than C, the time that has elapsed after an engine start is shorter than D and the cooling water temperature THW is lower than E °C. In such a case, therefore, even after the lapse of A seconds following engine start, the fuel injection timing set at step 104 is switched again from intake-asynchronous to intake-synchronous mode in order to restore the combustion state.

In the case where NE increases to or beyond F at step 109 after the fuel injection timing is set to intake-synchronous mode at step 112, control proceeds from step 109 to step 111 for determining whether or not the value on the counter G is less than H. In the case where G<H, control proceeds to step 112 and the fuel injection timing is kept in intake-synchronous mode. Only after G becomes equal to or larger than H, does control proceed to step 113 and the fuel injection timing is set to intake-asynchronous mode. This is because, if the fuel injection timing is switched to intake-asynchronous mode immediately after the engine speed NE exceeds a predetermined value F, the engine speed NE would be again reduced below the predetermined value F and the fuel combustion is liable to become unstable. The fuel injection timing is switched to intake-asynchronous mode desirably after the engine speed NE has been sufficiently restored.

Assume that the engine combustion state becomes unstable and the idle stability is deteriorated after the lapse of A seconds following engine start. As far as the combustion in the engine after the lapse of A seconds following engine start is not accompanied by any factors causing the combustion instability, the fuel injection timing is not required to be switched to intake-synchronous mode. Specifically, in the case where the shift position of the transmission is other than N at step 105, in the case where the intake amount is not smaller than C at step 106, in the case where the time that has elapsed after an engine start is not shorter than D at step 107 or in the case where THW≧E at step 108, then control proceeds to step 113 for setting the fuel injection timing to intake-synchronous mode thereby to end the routine.

Figure 3:
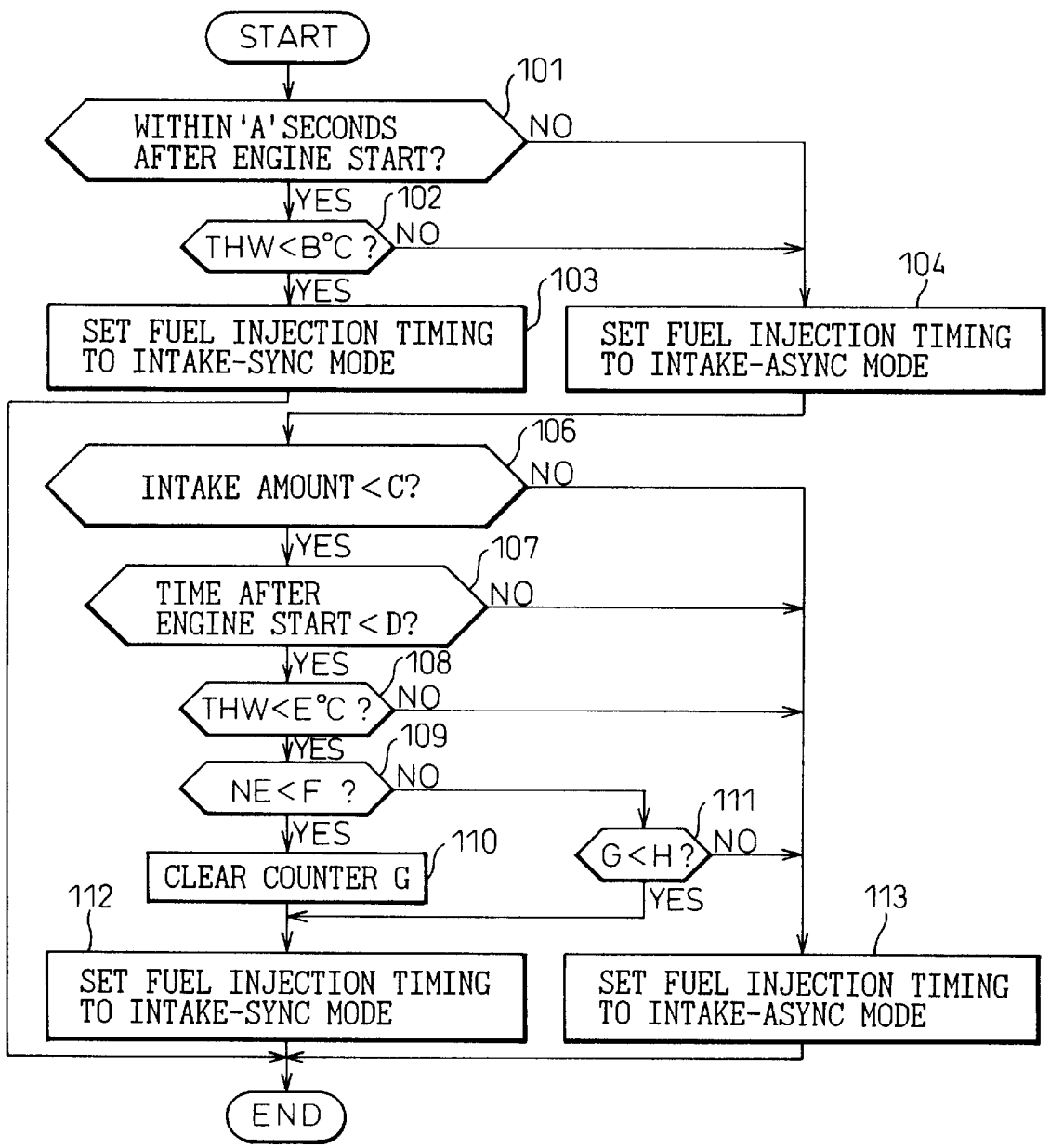
FIG. 3 is a flowchart showing the steps of control by the engine control apparatus at the time of engine start according to a modification of the first embodiment of the invention.

FIG. 3 shows the control steps executed in the engine control apparatus at the time of engine start according to a modification of the first embodiment of the invention. The control steps of FIG. 3 are similar to those of FIG. 2 except that step 105 is removed. The same steps as those in FIG. 2, therefore, are designated by the same reference numerals, respectively, and will not be described. In the first embodiment described with reference to FIG. 2, it is determined at step 105 whether or not the shift position of the transmission is neutral N. This is because the idling stability is generally more difficult to attain at neutral N than at drive D of shift position of the transmission. For an engine with large displacement in which the idling stability is secured even at the transmission shift position of neutral N, however, the step 105 can be done without as shown in FIG. 3.

The above-mentioned control operation exhibits a specially significant effect when the heavy fuel is used for the engine. The difference of the effect of the control operation between heavy fuel and light fuel in the first embodiment will be explained with reference to FIG. 4.

Figures 4A, 4B:
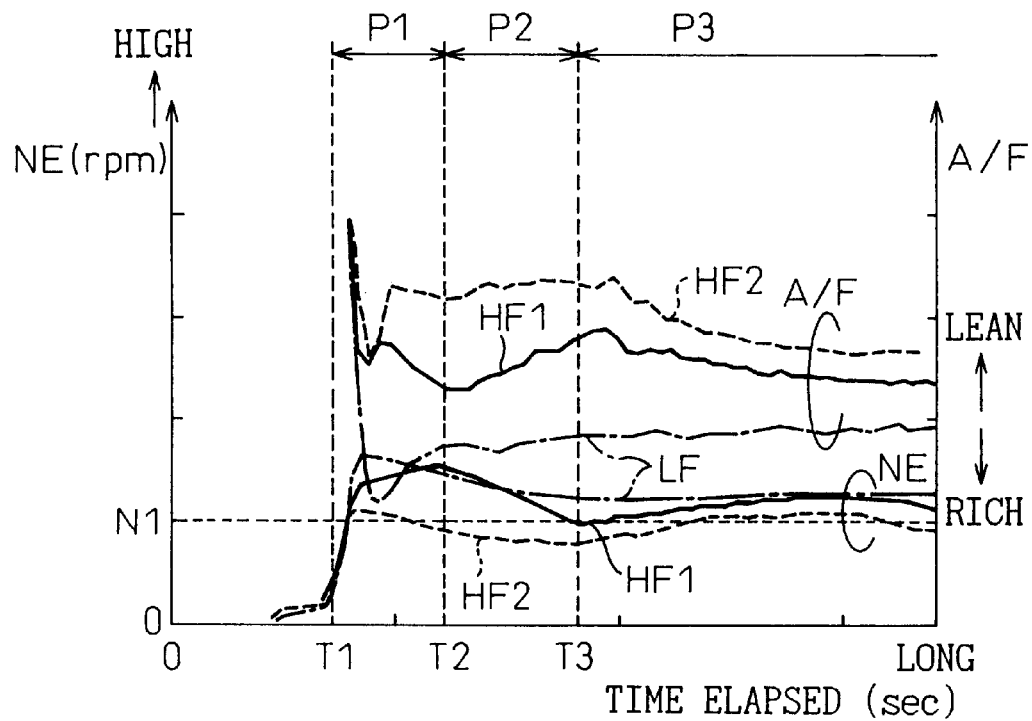
FIG. 4A is a diagram showing characteristics of engine speed and air-fuel ratio versus elapsed time representing the effect of the first embodiment at the time of engine start using heavy fuel and light fuel.
FIG. 4B is a table showing the types of fuel injection timing for each period in FIG. 4A.

FIG. 4A shows the relation between the lapse of time after an engine start and the engine speed NE. Reference characters HF1 and HF2 designate the characteristics obtained when the heavy fuel is used, and the reference character LF the characteristic for the light fuel. Time T1 is when the engine is started, and time T2 is the point when A seconds have passed from time T1. Assuming that P1 is the period from time T1 to time T2, the light fuel LF and the heavy fuel HF1 were injected in intake-synchronous mode as shown in FIG. 4B, while the heavy fuel HF2 was injected in intake-asynchronous mode. The heavy fuel HF2 continued to be injected in intake-asynchronous mode, while the light fuel LF and the heavy fuel HF1 were controlled in the manner described in the first embodiment of the invention with reference to FIG. 2.

As a result, in the case of an engine for which the heavy fuel HF2 continued to be injected in intake-asynchronous mode from engine start, the air-fuel ratio A/F remains considerably lean after an engine start, and the engine speed NE went up and down at a level less than N1 (say, 1000 rpm), thus presenting a symptom of stability. With the engine which uses the heavy fuel HF1 but in which the fuel is injected in intake-synchronous mode during the period P1 after an engine start, in contrast, the engine speed NE is considerably increased during the period P1. Also, the air-fuel ratio (A/F) does not go excessively lean. When the fuel is injected in intake-asynchronous mode after the lapse of the period P1, the speed NE of the engine using the heavy fuel HF1 decreases and is reduced below N1 rpm at time point T3. According to the first embodiment, however, the fuel injection timing is so controlled as to switch from intake-asynchronous to intake-synchronous mode at time point T3. The engine speed NE thus assumes a stabile state again exceeding N1 rpm.

Specifically, when the control operation according to the invention is used after starting the engine using the heavy fuel HF1, as shown in FIG. 4B, the intake-synchronous injection is effected during the period P1, while the fuel is injected in intake-asynchronous mode for the period P2 from time point T2 to time point T3 when the engine speed NE decreases below N1 rpm. On the other hand, the intake-synchronous injection prevails during the period P3 from time point T3 until the time D elapses from time point T3 (not shown in FIG. 4B). Consequently, even when the heavy fuel HF1 is used, the engine can continue to idle stably after cold start, as shown in FIG. 4A.

In an application of the control method, according to the invention, after starting the engine using the light fuel LF, on the other hand, the intake-synchronous injection is carried out during the period P1 as shown in FIG. 4B. As a result, as shown in FIG. 4A, the air-fuel ratio A/F goes rich and the engine speed NE exceeds N1 rpm by a wide margin. Even when the fuel injection timing switches to the intake-asynchronous mode at time point T2, the air-fuel ratio A/F remains rich with the engine speed NE settling at a level considerably higher than N1 rpm. In the engine using the light fuel LF, therefore, the intake-asynchronous injection is continued with a stable idling after time point T2.

As described above, in the control operation after an engine start according to the first embodiment of the invention, the idling after cold start of the engine is settled regardless of which is used, heavy fuel or light fuel.

Figure 5:
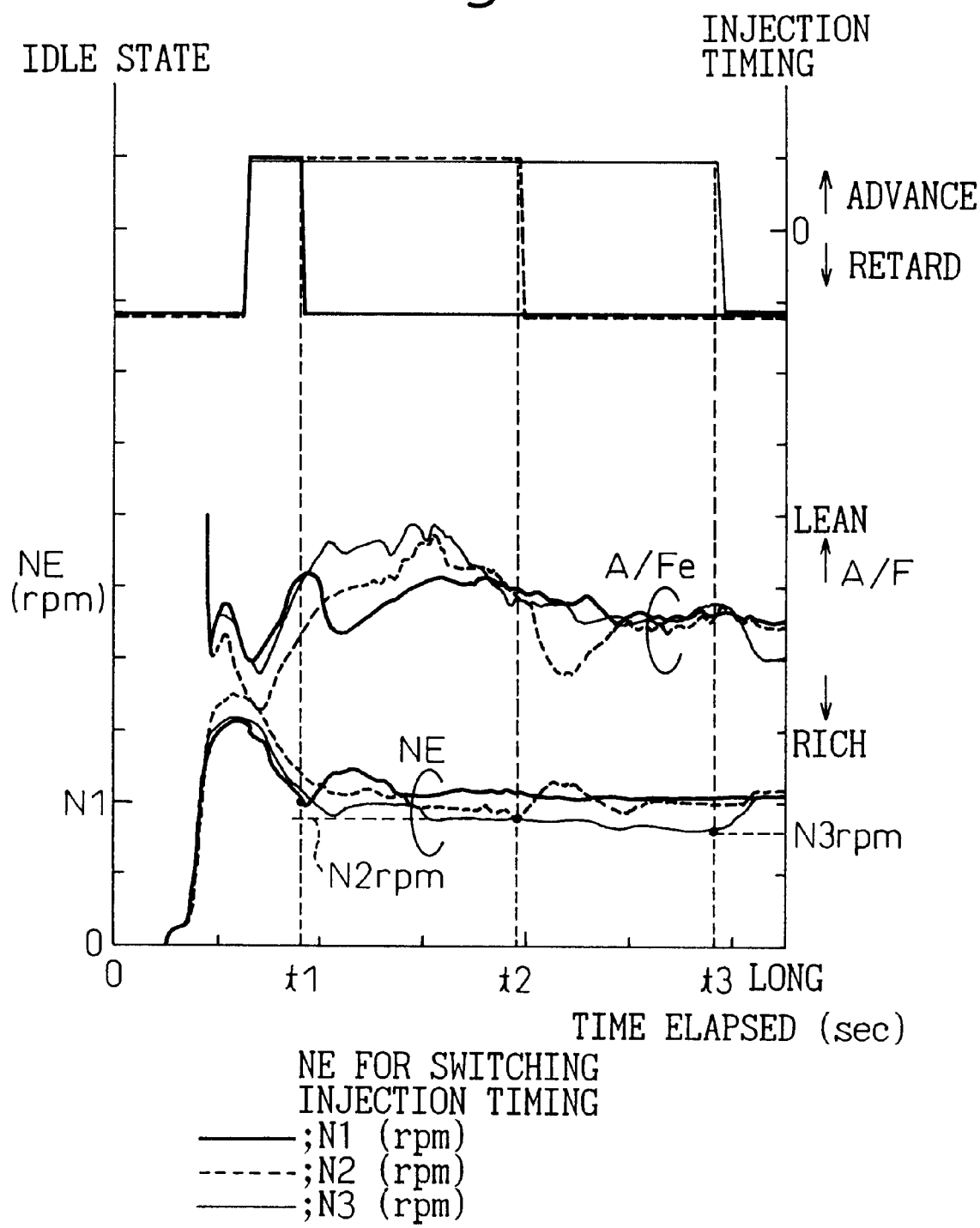
FIG. 5 is a characteristic diagram showing the reason why the engine speed at which the injection timing is switched is set to an appropriate value for control by the engine control apparatus at the time of engine start according to the first embodiment of the invention.

FIG. 5 shows the reason why the engine speed at which the injection timing is switched at step 109 is set to about N1 rpm for control at the time of engine start according to the first embodiment of the invention. The characteristics of injection timing, air-fuel ratio A/F and the engine speed NE with respect to the time elapsed after an engine start are shown for the engine speed of N1 rpm, N2 rpm and N3 rpm (N1>N2>N3) at which the injection timing is switched. For A seconds (=1 second) immediately following engine start, the intake-synchronous injection is effected for any engine speed, after which the intake-asynchronous mode is introduced as in the previous cases.

As seen from FIG. 5, in the case where the engine speed at which the injection timing is switched is set to N1 rpm, the intake-asynchronous injection is switched to intake-synchronous injection at time point t1, and therefore the subsequent engine speed NE settles at a level higher than N1 rpm. In the case where the engine speed at which the injection timing is switched is set to N2 rpm or N3 rpm, on the other hand, the intake-asynchronous injection is not switched to intake-synchronous injection before time point t2 or t3. The result is that an idling vibration occurs in the engine speed NE and the idle stability is deteriorated in the meantime. At least for preventing the idling vibration, therefore, the injection mode should be switched to intake-synchronous injection when the engine speed NE is reduced below N1 rpm after switching to intake-asynchronous injection after an engine start.

Figure 6:
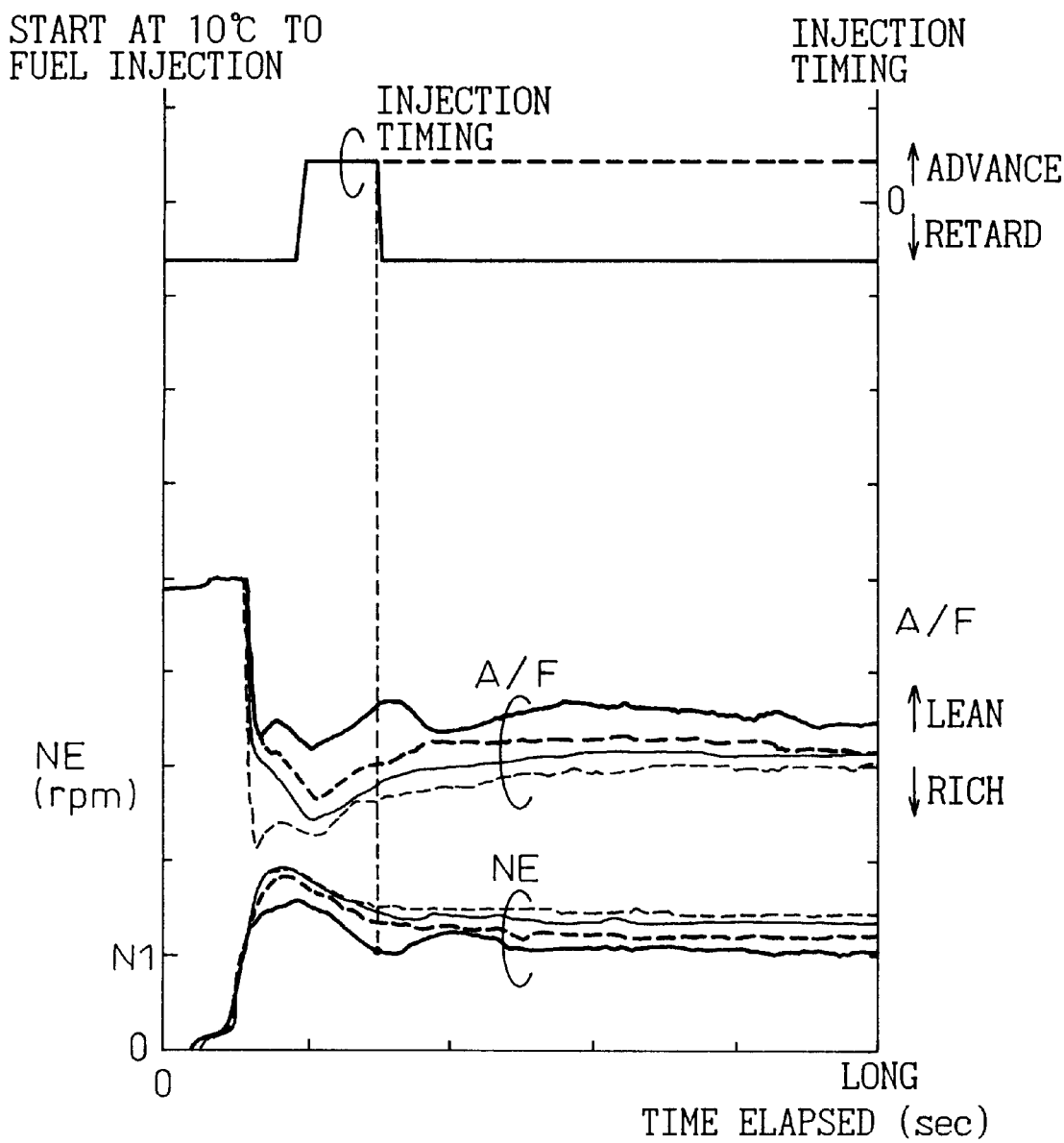
FIG. 6 is a characteristic diagram showing the relation between fuel type, fuel injection timing after an engine start, air-fuel ratio and engine speed for control by the engine control apparatus at the time of engine start according to the first embodiment of the invention.

FIG. 6 shows the fuel type versus change in injection timing, air-fuel ratio A/F and engine speed NE after an engine start for control at the time of engine start according to the first embodiment of the invention. In FIG. 6, a thick solid line represents the engine characteristic when the 100% heavy fuel is supplied to the engine, a thick dashed line represents the engine characteristic when a mixture of 75% heavy fuel and 25% light fuel is supplied to the engine, a thin solid line represents the engine characteristic when a mixture of 50% heavy fuel and 50% light fuel is supplied to the engine, and a thin dashed line represents the engine characteristic when 100% light fuel is supplied to the engine.

As seen from FIG. 6, even for the case of 100% heavy fuel giving rise to the worst starting characteristic, the excessive lean state of the air-fuel ratio can be suppressed and the subsequent engine speed NE can be settled at about N1 rpm by switching the fuel injection timing to intake-synchronous mode when the engine speed NE is reduced to below N1 rpm. This indicates that according to the control operation of the first embodiment, a stable idle state can be maintained after a cold start of the engine for any type of fuel.

Figure 7:
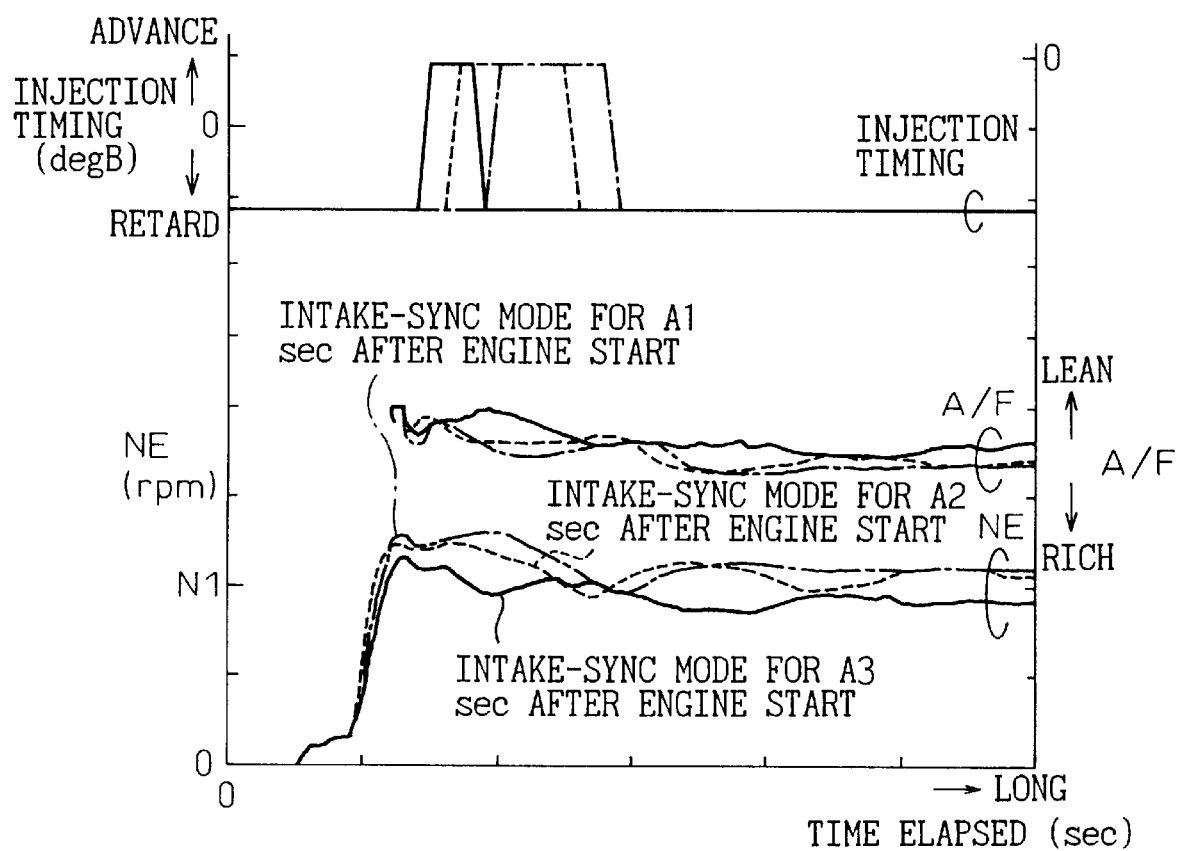
FIG. 7 is a characteristic diagram showing the effect that the length of the intake-synchronous injection time immediately after an engine start has on subsequent injection timing, air-fuel ratio and engine speed for control by the engine control apparatus at the time of engine start according to the first embodiment of the invention.

FIG. 7 is a characteristic diagram showing how the injection timing, air-fuel ratio and engine speed are affected by changing the duration of intake-synchronous injection timing immediately after an engine start in the engine start control operation according to the first embodiment of the invention. As seen from FIG. 7, in the case where the intake-synchronous injection timing immediately following engine start is set to A3 seconds or A2 seconds (A1>A2>A3), the engine speed NE is reduced to below N1 rpm within so short a time after switching to the intake-asynchronous injection that the intake-synchronous injection is restored rapidly. Even after the intake-asynchronous injection is switched to intake-synchronous injection, the engine speed NE is reduced below N1 rpm (for A3 seconds of the intake-synchronous injection timing immediately after an engine start), resulting in an unstable idling.

In the case where the intake-synchronous injection timing immediately after an engine start is set to A1 seconds, in contrast, the engine speed NE is known to decrease below N1 rpm after being switched to the intake-asynchronous injection. A stable state can be attained, however, by switching again to the intake-synchronous injection. This indicates that the intake-synchronous injection of at least 1 second is required immediately after an engine start.

In the above-mentioned first embodiment of control operation at the time of engine start, it is determined that the combustion is unstable and the idle stability is deteriorated when the shift position of the transmission is neutral N, the intake amount is less than C, the time elapsed after an engine start is shorter than D and the cooling water temperature THW is lower than E °C. It can also be determined that the combustion is unstable and the idling stability is deteriorated in any case other than the case where the engine speed NE is reduced below a predetermined value F. Examples will be explained as second to fourth embodiments below.

Figure 8:
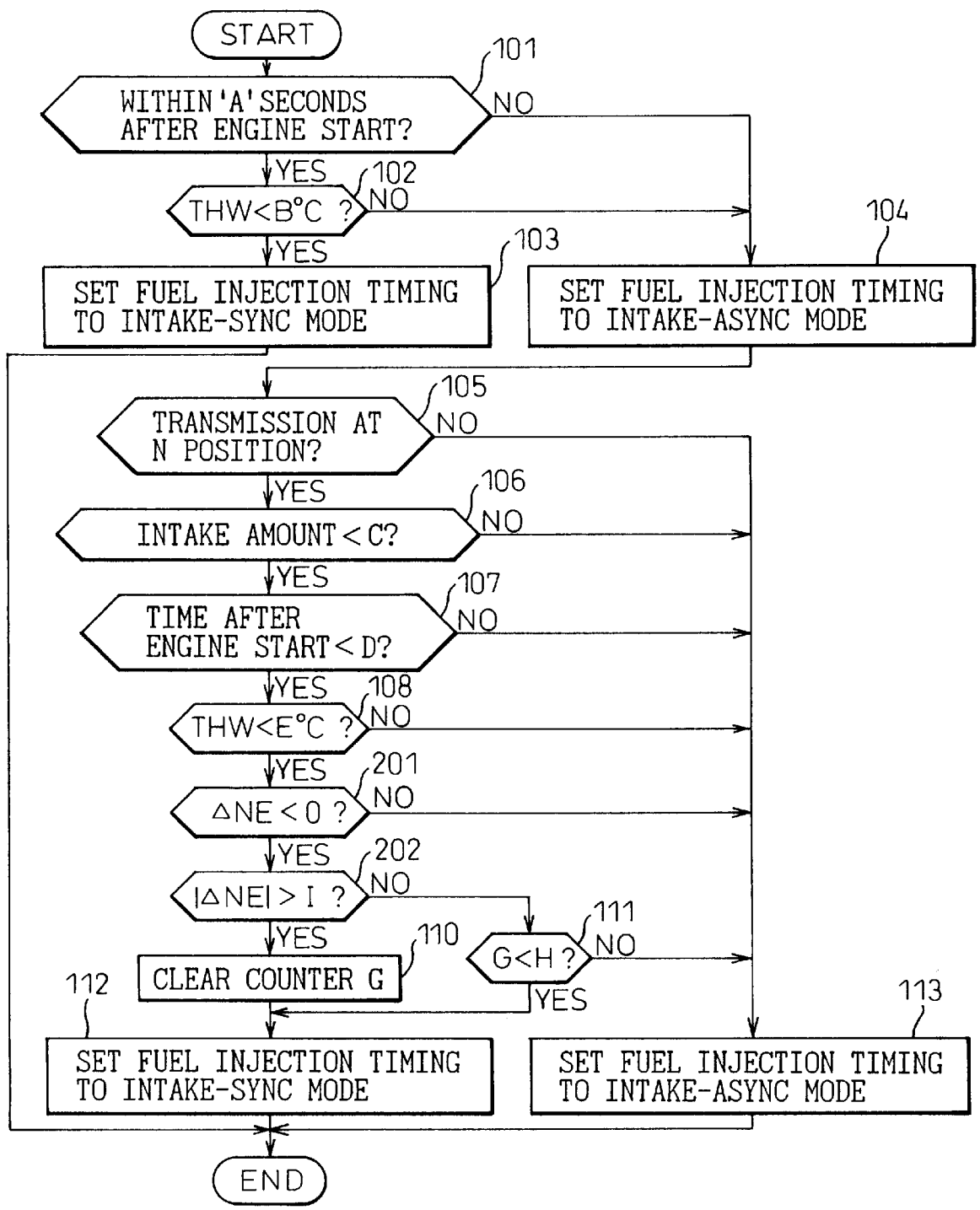
FIG. 8 is a flowchart showing the steps of control by the engine control apparatus at the time of engine start according to a second embodiment of the invention.

FIG. 8 is a flowchart showing the steps of engine start control by the engine control apparatus according to a second embodiment of the invention. The control steps according to the second embodiment are different from the control steps according to the first embodiment only in that the final determination as to whether or not the combustion is unstable and the idling stability is deteriorated is made not based on the reduction of the engine speed NE below a predetermined value F but based on the fact that the change ΔNE of engine speed NE is negative (speed on the decrease) and is larger than a predetermined value. The same control steps in the second embodiment as in the first embodiment are designated by the same reference numerals, respectively, and will be described only briefly.

Steps 101 to 108 and steps 110 to 113 in the second embodiment are identical to the corresponding steps in the first embodiment. In the second embodiment, therefore, at steps 101 to 108, the fuel injection timing is set to the intake-synchronous mode for A seconds after a cold engine start, after which it is determined whether the shift position of the transmission is neutral N or not, whether the intake amount is smaller than C or not, whether the time elapsed after an engine start is shorter than D or not and whether the cooling water temperature THW is lower than E °C. or not. Only in the case where THW<E °C. at step 108 does control proceed to step 201.

At step 201, it is determined whether the change AN of engine speed NE is negative, i.e. whether the engine speed is decreasing or not, and only in the case where ΔNE<0, does control proceed to step 202. At step 202, it is determined whether or not the absolute value of the change ΔNE of engine speed NE is smaller or not than a predetermined value I, and in the case where |ΔNE|>1, control proceeds to step 110 and the count on a free-run counter G is cleared. After the count on the counter G is cleared, control proceeds to step 112 where the fuel injection timing is set to intake-synchronous mode thereby to end this routine.

In the second embodiment, it is determined that the combustion is unstable and the idle stability is deteriorated based on the fact that the change ΔN of engine speed NE is negative and larger than a predetermined value when the shift position of the transmission is neutral N, the intake amount is less than C, the time elapsed after an engine start is shorter than D and the cooling water temperature THW is lower than E °C. In such a case, therefore, even after the lapse of A seconds following engine start, the fuel injection timing set at step 104 is switched again from intake-asynchronous to intake-synchronous mode thereby to restore the combustion state.

Also in the second embodiment, assuming that after the fuel injection timing is set to intake-synchronous mode at step 112, the condition |ΔNE|≦I is met at step 202. Even in such a case, control proceeds to step 112 and the fuel injection timing is kept in intake-synchronous mode until the counter G assumes a value of at least H, and only after G≧H is met, control proceeds to step 113 to switch the fuel injection timing to intake-asynchronous mode. This embodiment is the same as the first embodiment in that in the case where the shift position of the transmission is other than N at step 105, in the case where the intake amount is not smaller than C at step 106, in the case where the time elapsed after an engine start is not shorter than D at step 107 or in the case where THW≧E at step 108, then control proceeds to step 113 where the fuel injection timing is set to intake-asynchronous mode to thereby end this routine.

Figure 9:
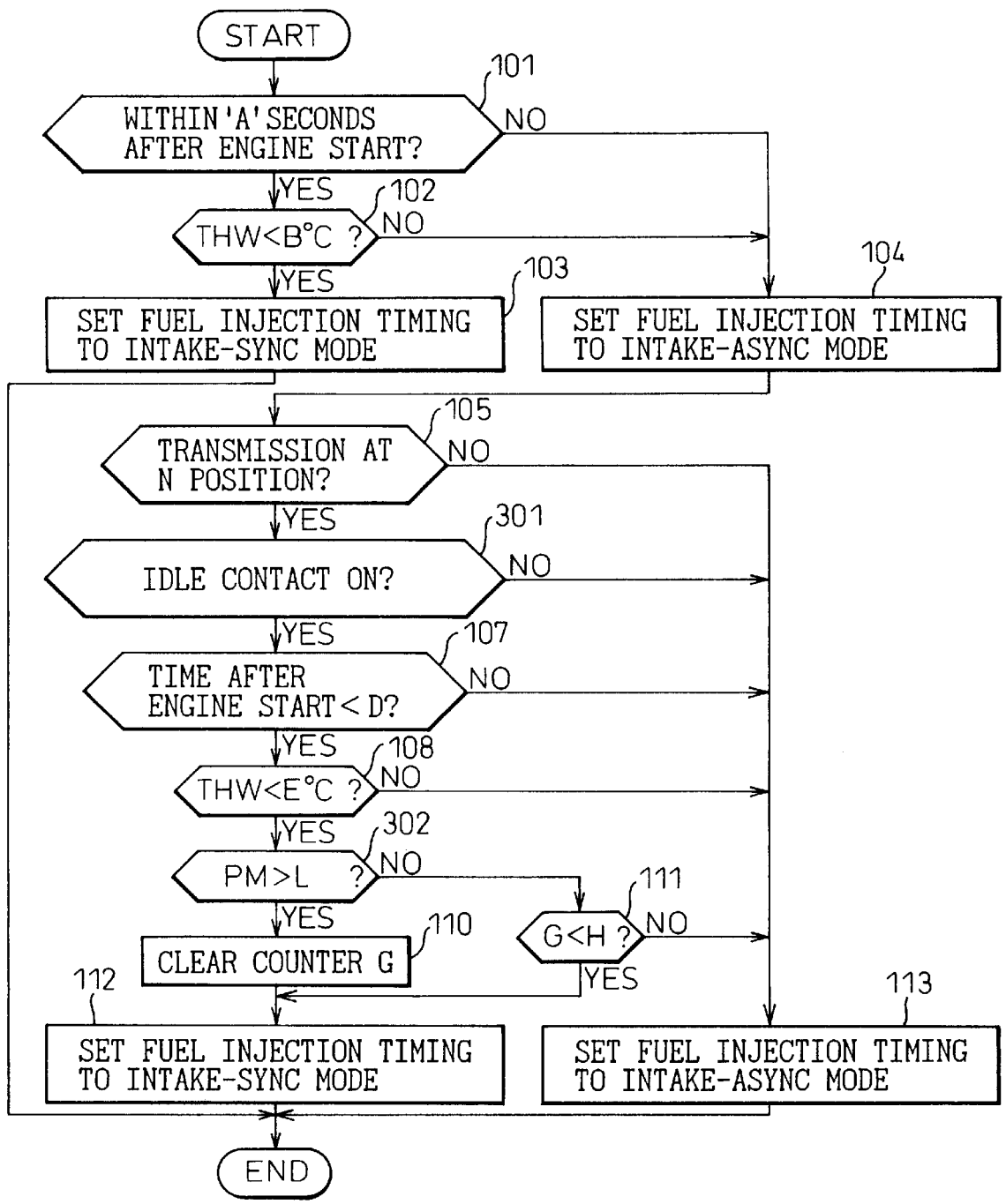
FIG. 9 is a flowchart showing the steps of control by the engine control apparatus at the time of engine start according to a third embodiment of the invention.

FIG. 9 is a flowchart showing the steps of engine start control by the engine control apparatus according to a third embodiment of the invention. The control steps of the third embodiment are different from the control steps according to the first embodiment only in that the final determination as to whether the combustion is unstable and the idling stability is deteriorated or not is not based on the reduction of the engine speed NE below a predetermined value F but is based on the fact that the intake pipe pressure PE is increased beyond a predetermined value. Thus, the same control steps in the third embodiment as in the first embodiment are designated by the same reference numerals, respectively, and will be described only briefly.

Steps 101 to 105, step 107, step 108 and steps 110 to 113 in the third embodiment are identical to the corresponding steps in the first embodiment. According to the third embodiment, therefore, at steps 101 to 105, the fuel injection timing is set to the intake-synchronous mode for A seconds after a cold engine start, after which it is determined whether the shift position of the transmission is neutral N or not. After step 105, control proceeds to step 301 for determining whether or not the idle contact is on. In the case where the idle contact is on, it is determined that the load is small and the combustion is liable to be unstable, so that control proceeds to step 107.

The determination at step 107 as to whether or not the time elapsed after an engine start is shorter than D and the next determination at step 108 as to whether or not the cooling water temperature is lower than E °C. are the same as the corresponding determinations in the first embodiment. Only in the case where the time elapsed after an engine start is shorter than D and THW is lower than E °C., does control proceed to step 302.

At step 302, it is determined whether or not the intake pipe pressure PM of the engine detected by the pressure sensor 3 is larger than a predetermined value L (400 mmHg in this embodiment), and in the case where the pressure PM is larger than the predetermined value L, it is determined that the combustion is unstable and control proceeds to step 110 for clearing the count on the free-run counter G. After the count on the counter G is cleared, control proceeds to step 112 where the fuel injection timing is set to intake-synchronous mode to end this routine.

According to the third embodiment, it is determined that the combustion is unstable and the idling stability is deteriorated based on the fact that the intake pipe pressure PM has increased beyond a predetermined value when the shift position of the transmission is neutral N, the idle contact is on, the time elapsed after an engine start is shorter than D and the cooling water temperature THW is lower than E °C. In such a case, therefore, even with the lapse of A seconds after an engine start, the fuel injection timing set at step 104 is switched from intake-asynchronous to intake-synchronous mode thereby to restore the combustion state.

Also in the third embodiment, assume that PM≦L at step 302 after the fuel injection timing is set to intake-synchronous mode at step 112. Until the counter G comes to assume a value not less than H, control proceeds to step 112 while the fuel injection timing is kept in intake-synchronous mode. Only after G reaches or increases beyond H, does control proceed to step 113 to switch the fuel injection timing to intake-asynchronous mode. This embodiment is also similar to the first embodiment in that control proceeds to step 113 in the case where the shift position of the transmission is other than N at step 105, in the case where the idle contact is off at step 301, in the case where the time elapsed after an engine start is not shorter than D at step 107 or in the case where THW is not lower than E at step 108. At step 113, the fuel injection timing is set to intake-asynchronous mode thereby to end this routine.

Figure 10:
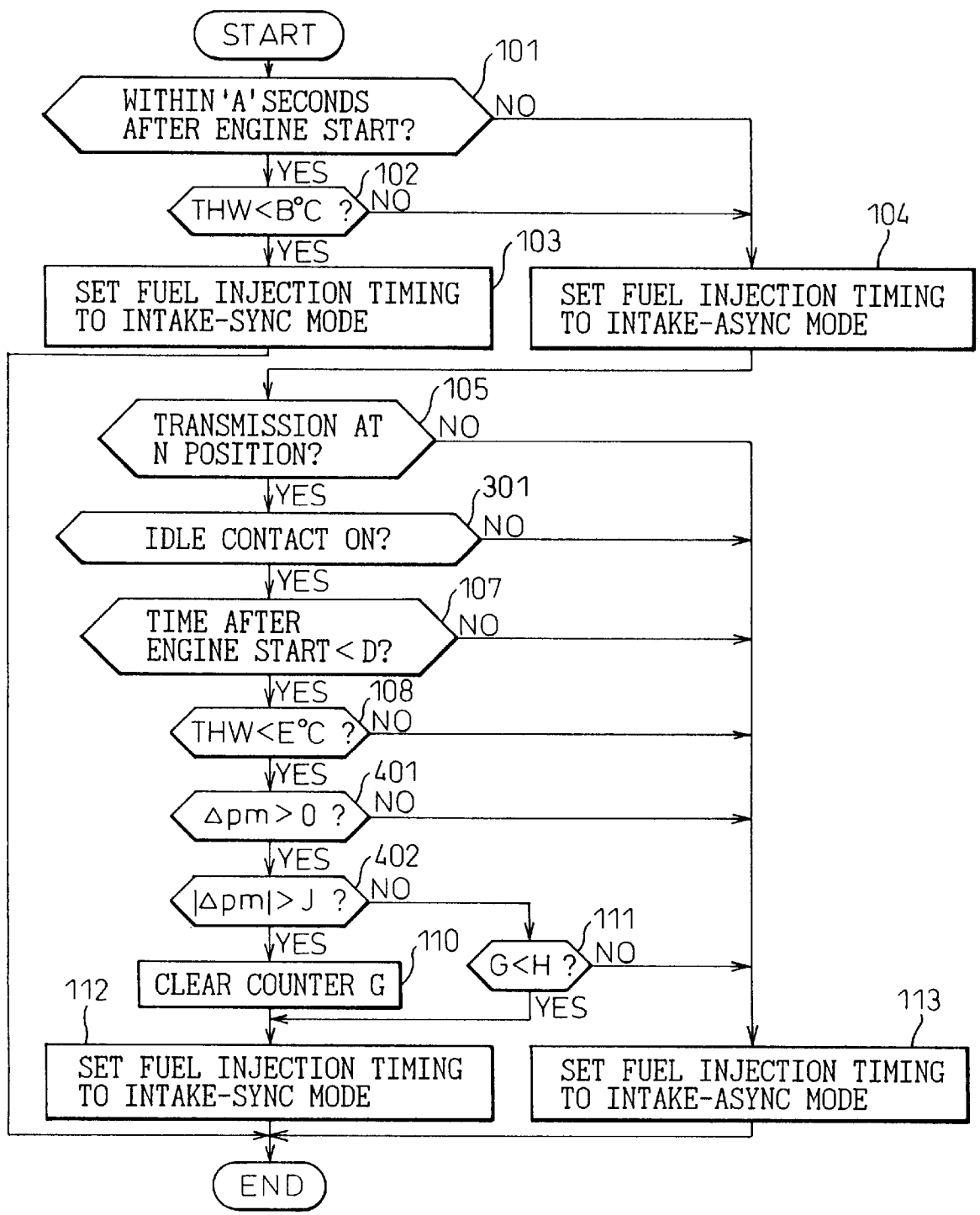
FIG. 10 is a flowchart showing the steps of control by the engine control apparatus at the time of engine start according to a fourth embodiment of the invention.

FIG. 10 is a flowchart showing the steps of engine start control by the engine control apparatus according to this invention according to a fourth embodiment. The control steps of the fourth embodiment are different from the control steps according to the first embodiment only in that the final determination as to whether the combustion is unstable and the idling stability is deteriorated or not is not based on the reduction of the engine speed NE to below a predetermined value F but is based on the fact that the change amount of the intake pipe pressure PM is positive and increases beyond a predetermined value. Thus, the same control steps in the fourth embodiment as in the first to third embodiments are designated by the same reference numerals and will be described only briefly.

Steps 101 to 105, step 107, step 108 and steps 110 to 113 in the fourth embodiment are identical to the corresponding steps in the first embodiment. According to the fourth embodiment, therefore, at steps 101 to 105, the fuel injection timing is set to the intake-synchronous mode for A seconds after a cold engine start, after which it is determined whether the shift position of the transmission is neutral N or not. At the end of step 105, control proceeds to step 301 to thereby determine whether or not the idle contact is on as in the third embodiment. In the case where the idle contact is on, it is determined that the load is small and the combustion is liable to be unstable, so that control proceeds to step 107.

The determination at step 107 as to whether or not the time elapsed after an engine start is shorter than D and the next determination at step 108 as to whether or not the cooling water temperature THW is lower than E °C. are the same as the corresponding determinations in the first embodiment. Only in the case where the time elapsed after an engine start is shorter than D and THW is lower than E °C., does control proceed to step 401.

At step 401, it is determined whether or not the change amount Δpm of the intake pipe pressure PM (difference between previous intake pipe pressure and current intake pipe pressure) of the engine detected by the pressure sensor 3 is positive or negative, i.e. whether the intake pipe pressure is increasing or decreasing. Only in the case where Δpm is smaller than 0, does control proceed to step 402. At step 402, it is determined whether or not the absolute value of the change amount Δpm of the intake pipe pressure PM is smaller than a predetermined value J or not, and in the case where |Δpm|>J, control proceeds to step 110 for clearing the count on the free-run counter G. After the count on the counter G is cleared, control proceeds to step 112 where the fuel injection timing is set to intake-synchronous thereby to end this routine.

In the fourth embodiment, it is determined that the combustion is unstable and the idling stability is deteriorated based on the fact that the change amount Δpm of the intake pipe pressure PM is positive and the absolute value thereof has increased beyond a predetermined value J when the shift position of the transmission is neutral N, the idle contact is on, the time elapsed after an engine start is shorter than D and the cooling water temperature THW is lower than E °C. In such a case, therefore, even with the lapse of A seconds after an engine start, the fuel injection timing set at step 104 is switched from intake-asynchronous to intake-synchronous mode thereby to restore the combustion state.

Also in the fourth embodiment, assume that |Δpm|≦J at step 401 after the fuel injection timing is set to intake-synchronous mode at step 112. Until the counter G assumes a value not less than H, control proceeds to step 112 to keep the fuel injection timing in intake-synchronous mode. Only after G assumes a value not less than H, does control proceed to step 113 to switch the fuel injection timing to intake-asynchronous mode. This embodiment is also similar to the first embodiment in that control proceeds to step 113 where the fuel injection timing is set to intake-asynchronous mode thereby to end this routine, in the case where the shift position of the transmission is other than N at step 105, in the case where the idle contact is off at step 301, in the case where the time elapsed after an engine start is not shorter than D at step 107 or in the case where THW is not lower than E at step 108.

In the control operation according to the first to fourth embodiments described above, the intake-synchronous injection is carried out for a very short length of time immediately after a cold engine start, followed by intake-asynchronous injection. In the case where it is determined that the combustion is unstable and the idling stability is deteriorated during this intake-asynchronous injection, the intake-synchronous mode is temporarily restored to maintain a stable engine combustion and a stable idle state. In the control operation according to this embodiment, in contrast, the ignition timing is advanced for a very short length of time immediately after a cold engine start, and soon after that, is switched to the base ignition timing. In the case where it is determined that the combustion is unstable and the idling stability is deteriorated during this base ignition time, the ignition timing is temporarily advanced. The control operation according to this fifth embodiment will be explained with reference to FIG. 11.

Figure 11:
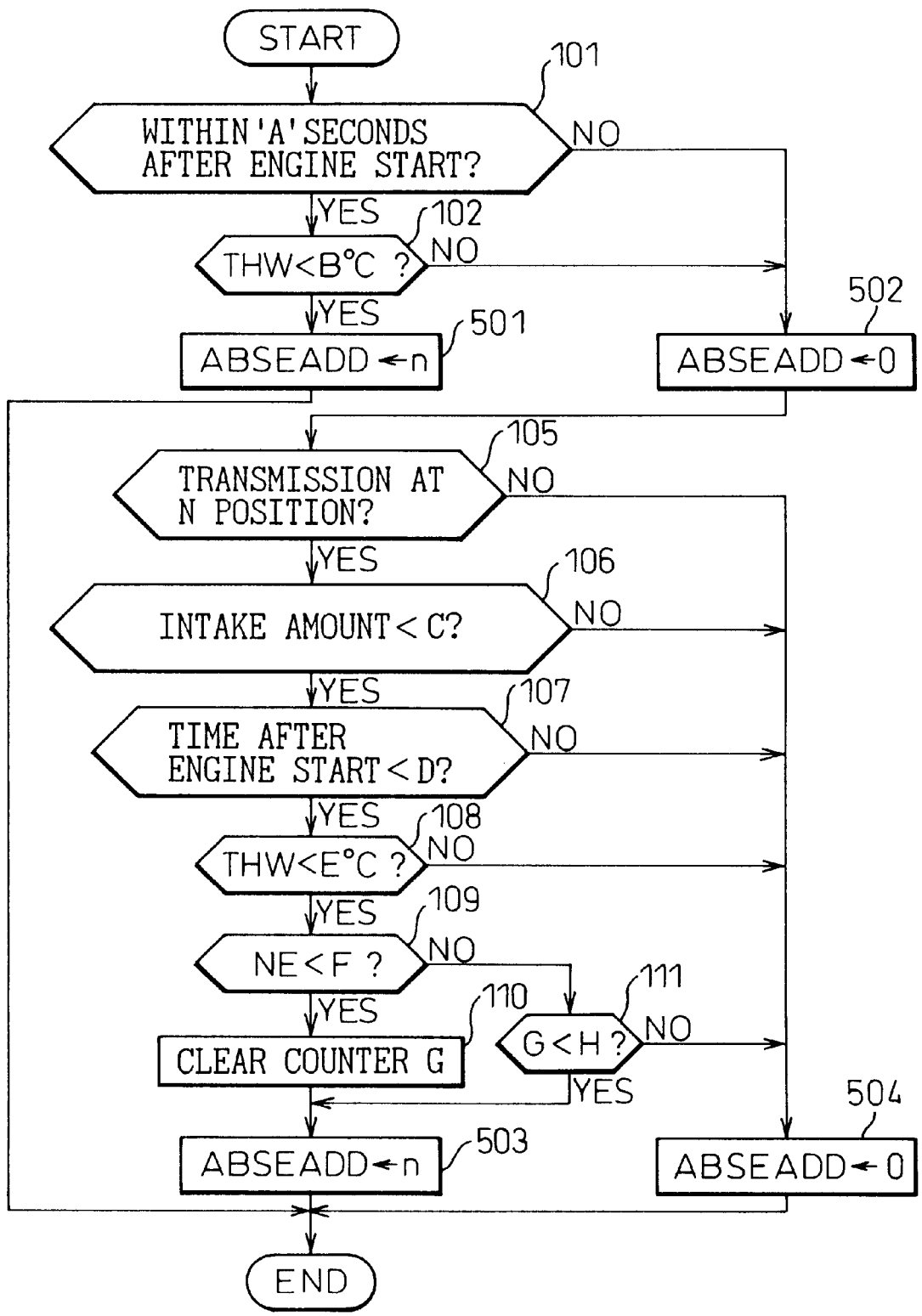
FIG. 11 is a flowchart showing the steps of control by the engine control apparatus at the time of engine start according to a fifth embodiment of the invention.

FIG. 11 is a flowchart showing the steps of controlling the engine start by the engine control apparatus according to the fifth embodiment of the invention. The control steps of the fifth embodiment are different from those of the first embodiment only in that the ignition timing is switched from base ignition timing to advanced ignition timing instead of switching to intake-synchronous injection in the case where the combustion is unstable and the idle stability is deteriorated during the intake-synchronous injection immediately after a cold engine start and during the subsequent intake-asynchronous injection. Therefore, the same control steps in the fifth embodiment as the corresponding ones in the first embodiment will be designated by the same reference numerals and will be described only briefly.

According to the fifth embodiment, it is determined whether the engine is started cold or not at steps 101 and 102. In the case where the engine is started cold, control proceeds to step 501. Otherwise, control proceeds to step 502. At step 501, the ignition timing is advanced to end the routine, while at step 502, the ignition timing is kept at the base ignition timing and control proceeds to step 105.

Next, the ignition timing of the engine will be explained. The final ignition timing AOP of the engine is determined based on the base ignition timing AOPBSE (NE, load) determined by the engine speed and load and based on the correction amount AOPBSE of the base ignition timing AOPBSE (NE, load) according to the following equation.

AOP←AOPBSE (NE, load)+ABSEADD

At step 501, ABSEADD reaches a predetermined value n (>0), and therefore the final ignition timing AOP is advanced, while at step 502, ABSEADD is 0 and therefore the final ignition timing AOP is kept at the base ignition timing AOPBSE (NE, load).

As described above, the ignition timing is advanced for A seconds following the cold engine start, and after the lapse of A seconds following the cold engine start, it is determined at step 105 as in the first embodiment whether the shift position of the transmission is neutral N or not, followed by step 106 where it is determined whether the intake amount is smaller than C or not, followed by step 107 where it is determined whether the time elapsed after an engine start is shorter than D, followed by step 108 where it is determined whether the cooling water temperature THW is lower than E °C. or not, followed by step 109 where it is determined whether the engine speed NE is lower than a predetermined value F. In the case where the answers at steps 105 to 109 are all affirmative, the count on the free-run counter G is cleared at step 110, and control proceeds to step 503 where the ignition timing is advanced thereby to end the routine.

Also in the fifth embodiment, assume that NE assumes a value not less than F at step 109 after the ignition timing is advanced at step 503. In such a case, too, until the value on the counter G assumes a value not less than H, control proceeds to step 503 for keeping the ignition timing advanced, while the ignition timing is set to the base ignition timing only after the counter G assumes a value of not less than H. In the case where the answer at any one of steps 105 to 108 is negative, on the other hand, control proceeds to step 504 where the ignition timing is set to the base ignition timing to thereby end the routine.

Though not shown in the flowchart, if the ignition timing is changed in the fifth embodiment, a known weighted-mean process of the ignition timing is appropriately executed in order to prevent a combustion fluctuation.

Figure 12:
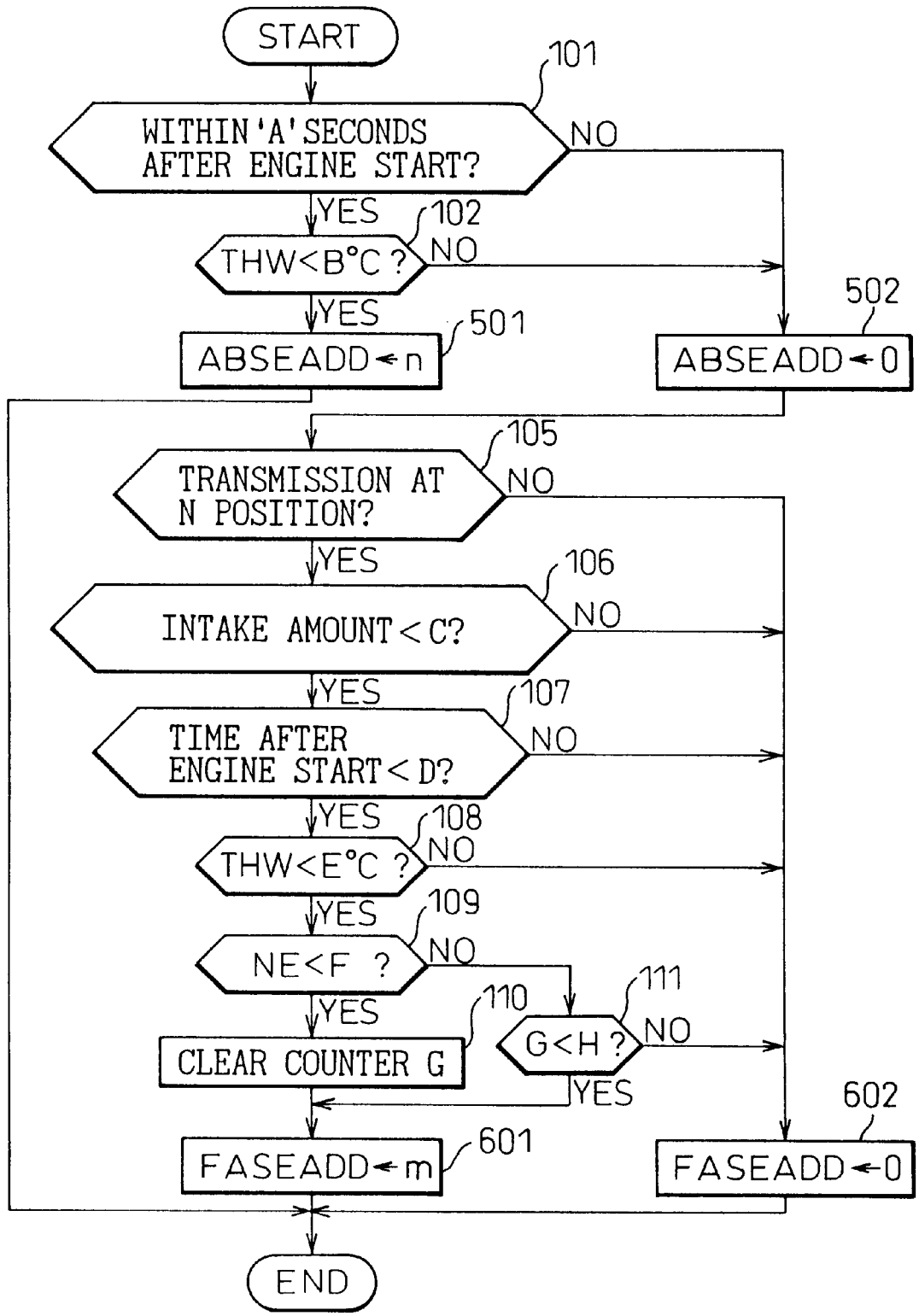
FIG. 12 is a flowchart showing the steps of control by the engine control apparatus at the time of engine start according to a sixth embodiment of the invention.

FIG. 12 is a flowchart showing the steps for engine start control according to a sixth embodiment of the invention. The control steps of the sixth embodiment are substantially the same as those of the fifth embodiment. The only difference lies in that, in the case where the combustion is unstable and the idle stability is deteriorated during the base ignition timing after the lapse of A seconds of cold engine start, the fuel injection amount is increased at step 601 instead of advancing the ignition timing from the base ignition timing. In the case where the combustion is stable and the idle stability is satisfactory during the base ignition timing after the lapse of A seconds of cold engine start, the fuel injection amount is kept at the base fuel injection amount. The controls steps 101 to 111 in the fifth embodiment are exactly identical to the corresponding steps in the sixth embodiment. Therefore, the same control steps are designated by the same reference numerals, respectively, and will not be described.

The fuel injection amount TAUP is determined from the following equation.

TAUP=(1+FASE)×TAU

FASE=FASEBASE(t)+FASEADD

At step 601, FASEADD assumes a predetermined value m (>0). Therefore, FASE increases beyond FASEBASE(t) so that the fuel injection amount is set upward, followed by step 602 where FASEADD is 0 and therefore FASE is equal to FASEBASE(t). Thus the fuel injection amount TAUP is not set upward but kept at the base fuel injection amount.

Also in the sixth embodiment, even in the case where NE reaches a value not less than F at step 109 after the fuel injection amount is set upward at step 601, control proceeds to step 601 while the fuel injection amount is kept set upward until the count on the counter G reaches at least H. Only after G assumes a value not less than H, does control proceed to step 602 for setting the fuel injection amount to the base fuel injection amount. In the case where the answer at any one of steps 105 to 108 is negative, in contrast, control proceeds to step 601 where the routine is ended while the fuel injection amount is kept at the base fuel injection amount.

Though not shown in this flowchart, if the fuel injection amount is changed in the sixth embodiment, a known weighted-mean process of the fuel injection amount is appropriately adjusted to prevent a combustion fluctuation.

Figure 13:
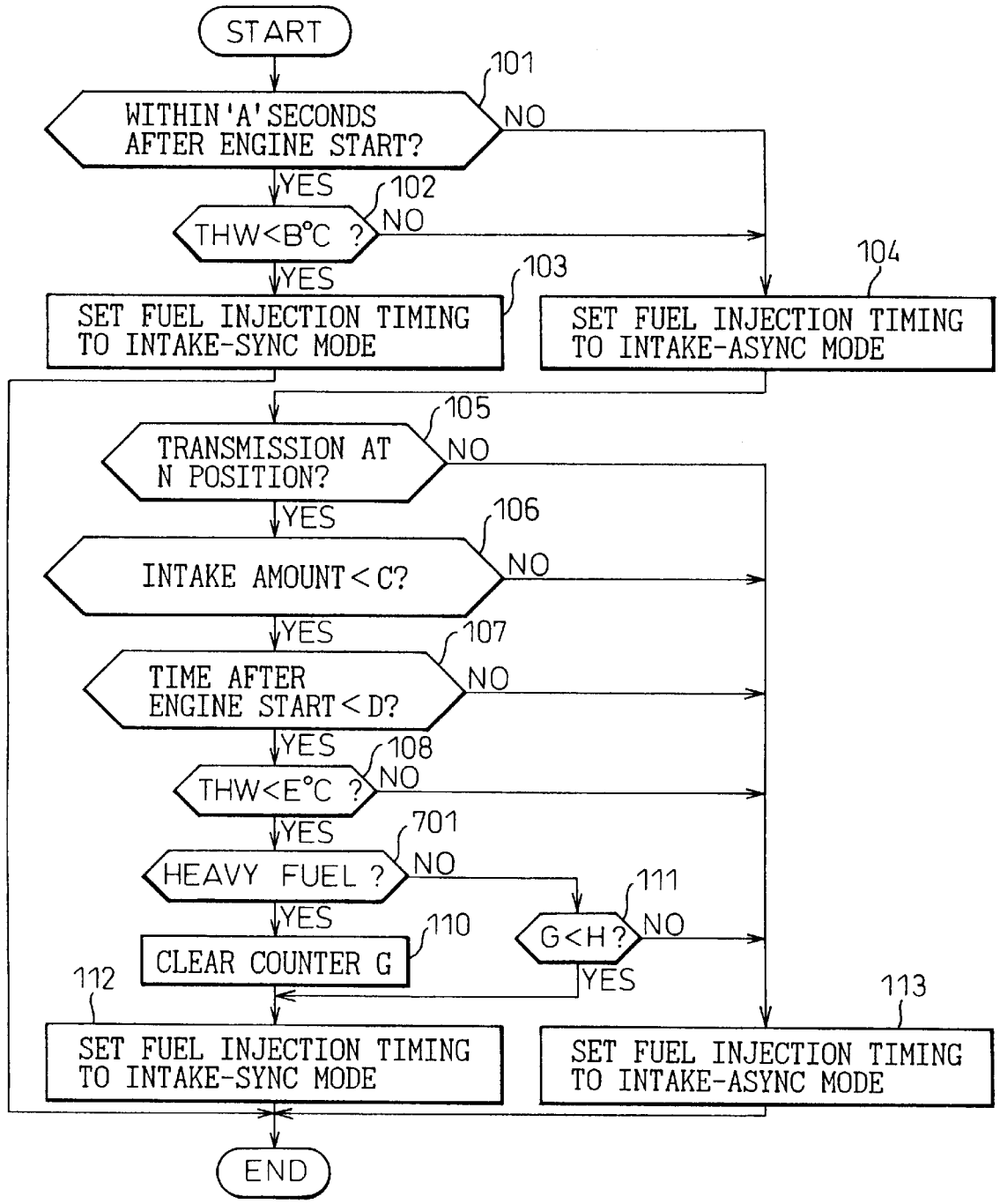
FIG. 13 is a flowchart showing the steps of control by the engine control apparatus at the time of engine start according to a seventh embodiment of the invention.

FIG. 13 is a flowchart showing the steps of engine start control according to a seventh embodiment of the invention. The control steps according to the seventh embodiment are substantially the same as those of the first embodiment, and the only difference therein lies in that the final determination as to whether the combustion is unstable and the idling stability is deteriorated during the intake-asynchronous injection after the lapse of A seconds of cold engine start is not based on the reduction of the engine speed NE below the predetermined value F but is based on the determination at step 701 as to whether or not heavy fuel or light fuel is employed. Consequently, according to the seventh embodiment, the control steps are exactly identical to the corresponding steps in the first embodiment, except that step 109 in the first embodiment is replaced by step 701 in the seventh embodiment. Thus, the same control steps in the seventh embodiment as the corresponding steps in the first embodiment are designated by the same reference numerals, respectively, and will not be described below.

Figure 14A:
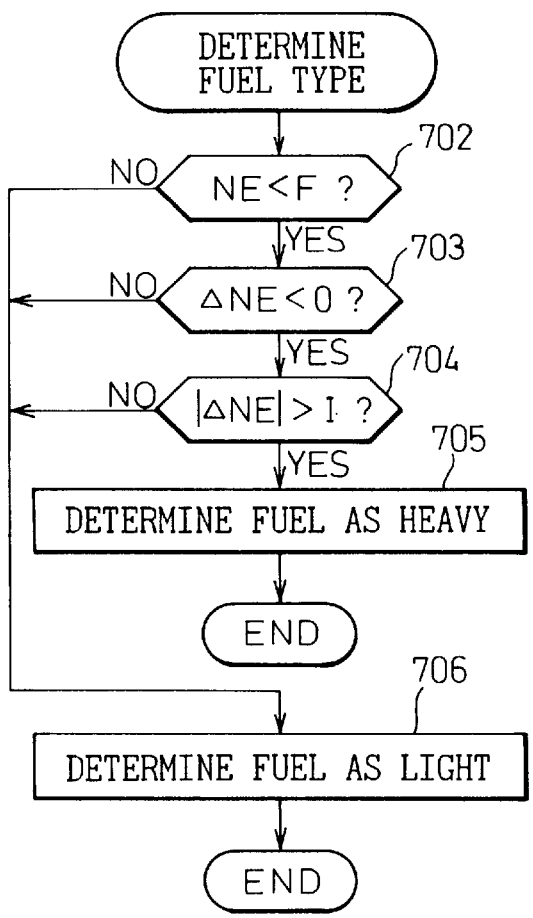
FIGS. 14A, 14B are two flowcharts showing the steps of determining the fuel type for control by the engine control apparatus at the time of engine start according to the seventh embodiment of the invention.
Figure 14B:
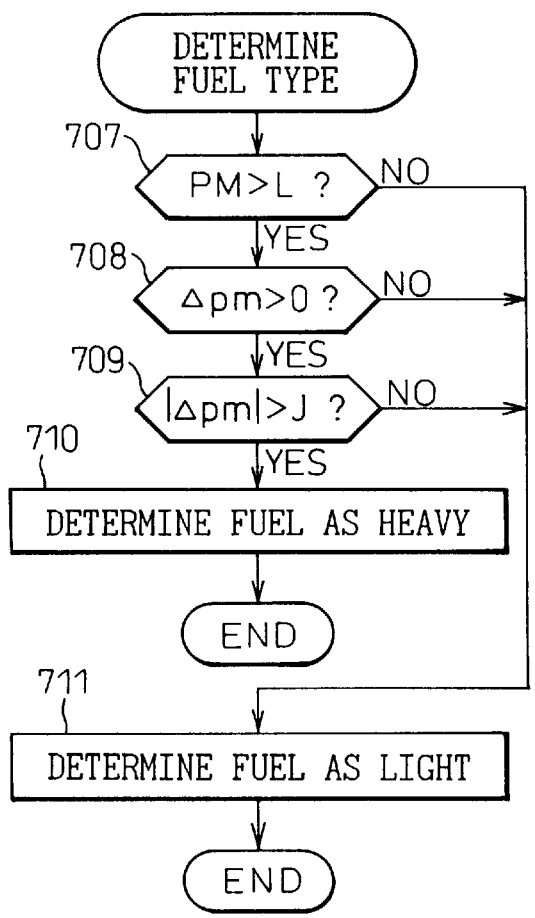

The determination as to whether the fuel is heavy fuel or light fuel at step 701 in the seventh embodiment is made by at least one of the processes for determining the fuel type shown in FIGS. 14A, 14B. Specifically, in one determination process, it is determined at step 702 whether or not the engine speed NE is lower than a predetermined value F, and in the case where NE<F, control proceeds to step 703. At step 703, it is determined whether or not the change rate ΔNE of the engine speed NE is negative, i.e. whether or not the engine speed is on the decrease, and only in the case where ΔNE<0 does control proceed to step 704. At step 704, it is determined whether or not the absolute value of the change rate ΔNE of the engine speed NE is larger than a predetermined value I, and in the case where |ΔNE|>1, control proceeds to step 705 where it is determined that the fuel is the heavy fuel. In the case where it is determined that NE≧F at step 702, in the case where it is determined that NE≧0 at step 703 or in the case where it is determined that |ΔNE|≦I at step 704, on the other hand, control proceeds to step 706 where it is determined that the fuel is light fuel.

In the other determination process, it is determined at step 707 whether the intake pipe pressure PM of the engine detected by the pressure sensor 3 is higher than a predetermined value L (400 mmHg in this embodiment), and in the case where it is higher than the predetermined value L, control proceeds to step 708. At step 708, it is determined whether or not the change amount Δpm of the intake pipe pressure PM (difference between the previous intake pipe pressure and the current intake pipe pressure) of the engine detected by the pressure sensor 3 is positive or negative, i.e. whether the intake pipe pressure is on the increase or on the decrease. Only in the case where Δpm>0, control proceeds to step 709. At step 709, it is determined whether or not the absolute value of the change amount Δpm of the intake pipe pressure PM is larger than a predetermined value J, and in the case where |Δpm|>J, control proceeds to step 710, where it is determined that the fuel is heavy fuel. In the case where it is determined that PM≦L at step 707, in the case where it is determined that Δpm≦0 at step 708 or in the case where it is determined that |pm|<J at step 709, on the other hand, control proceeds to step 711 where it is determined that the fuel is the light fuel.

Also in the engine start control operation according to the second to seventh embodiments of the invention described above, as in the first embodiment described with reference to FIG. 4A, an idle stability can be secured after a cold engine start regardless of the fuel type.

Figure 15:
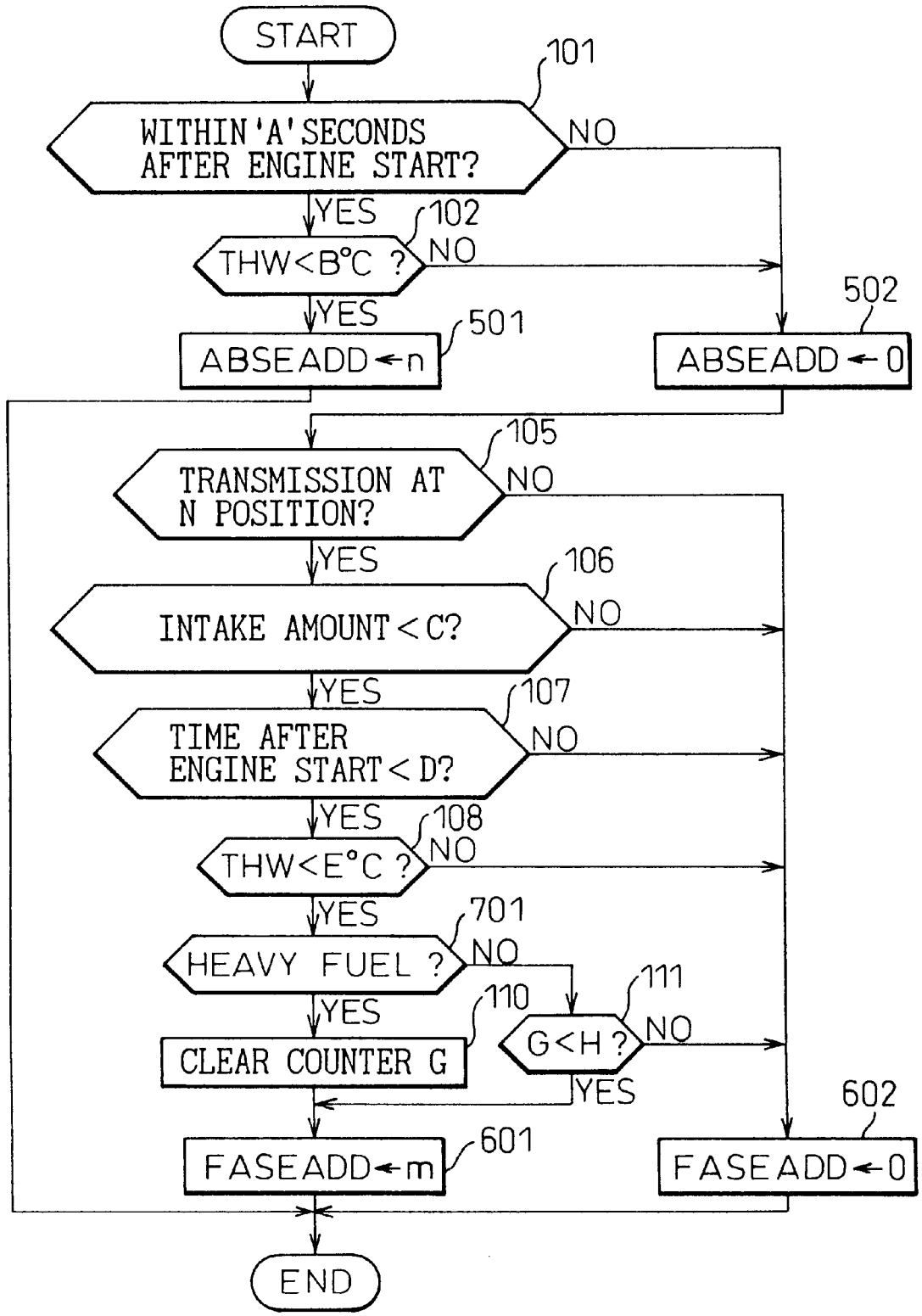
FIG. 15 is a flowchart showing the steps of control by the engine control apparatus at the time of engine start according to a eighth embodiment of the invention.

FIG. 15 is a flowchart showing the steps of controlling the engine start by the engine control apparatus according to the eighth embodiment of the invention. The control steps of the eighth embodiment are different from those of the seventh embodiment only in that steps 103, 104, 112, and 113 are replaced by steps 501, 502, 601, and 602. Steps 501, 502, 601, and 602 are explained in the sixth embodiment. Therefore, the same control steps in the eighth embodiment as the corresponding ones in the sixth and seventh embodiments will be designated by the same reference numerals and the explanation thereof will be omitted.

What is claimed is:

1. A control apparatus for assuring stable idling of an internal combustion engine immediately after a cold engine start, the engine including at least one cylinder and a corresponding intake valve associated therewith, the control apparatus comprising:

means for measuring a time elapsed after an engine start;
means for detecting an idle stability; and
means for controlling a fuel injection timing, wherein said fuel injection timing control means includes:
first intake-synchronous injection means for executing intake-synchronous injection only during a first predetermined time immediately after an engine start;
intake-asynchronous injection means for executing intake-asynchronous injection after said first predetermined time has elapsed; and
second intake-synchronous injection means for executing intake-synchronous injection temporarily when the idle stability of the engine has deteriorated before a second predetermined time has elapsed, wherein the second predetermined time begins after the lapse of said first predetermined time;

wherein, during intake-synchronous injection, fuel is infected to the at least one cylinder only while the corresponding intake valve is open and, during intake-asynchronous infection, fuel is infected to the at least one cylinder only while the corresponding intake valve is closed.

2. An engine control apparatus according to claim 1, further comprising means for detecting the engine speed, wherein said idle stability detection means determines that the idle stability of the engine is deteriorated in the case where the engine speed is reduced below a reference engine speed.

3. An engine control apparatus according to claim 1, further comprising means for detecting the engine speed, wherein said idle stability detection means determines that the idle stability of the engine is deteriorated in the case where the reduction of the engine speed is not less than a predetermined value.

4. An engine control apparatus according to claim 1, further comprising means for detecting the intake pipe pressure of the engine, wherein said idle stability detection means determines that the idle stability of the engine is deteriorated in the case where the intake pipe pressure is not less than a predetermined value.

5. An engine control apparatus according to claim 1, further comprising means for detecting the intake pipe pressure of the engine, wherein said idle stability detection means determines that the idle stability is deteriorated in the case where the increase in the intake pipe pressure is not less than a predetermined value.

6. An engine control apparatus according to claim 1, further comprising means for detecting the temperature of the engine, wherein said engine temperature detecting means activates said intake-asynchronous injection means when the engine temperature is not lower than a predetermined temperature even within said first predetermined time immediately after an engine start.

7. An engine control apparatus according to claim 1, wherein said second intake-synchronous injection means is switched to said intake-asynchronous injection means when the operation time of said second intake-synchronous injection means exceeds a third predetermined time.

8. An engine control apparatus according to claim 7, wherein said second intake-synchronous injection means is switched to said intake-asynchronous injection means when the engine is restored to a stable idle state even in the case where the operation time of said second intake-synchronous injection means is within said third predetermined time.

9. An engine control apparatus according to claim 1, further comprising means for detecting the neutral position of the transmission, wherein said second intake-synchronous injection means operates only when said transmission is in the neutral position.

10. An engine control apparatus according to claim 1, further comprising means for detecting the intake air amount, wherein said second intake-synchronous injection means operates only when the intake air amount is lower than a reference value.

11. An engine control apparatus according to claim 1, wherein said second intake-synchronous injection means is switched to the intake-asynchronous injection means in the case where the engine temperature detected by said engine temperature detection means exceeds another predetermined temperature higher than said first predetermined temperature even before the operation time of said second intake-synchronous injection means exceeds said third predetermined time.

12. An engine control apparatus according to claim 2, wherein said reference engine speed is set after taking the vehicle vibration into consideration.

13. An engine control apparatus according to claim 2, wherein said first predetermined time is as long as required for increasing the engine speed to at least the reference engine speed at the time of an engine start.

14. An engine control apparatus according to claim 13, wherein said first predetermined time is not shorter than one second.

15. A control apparatus, for an internal combustion engine, intended to assure an idle stability immediately after a cold engine start, including means for measuring the time elapsed after an engine start, means for storing the idling characteristics after a cold engine start for the light fuel and the heavy fuel supplied to the engine, and means for controlling the timing of fuel injection into the engine, wherein said fuel injection timing control means comprising:

first intake-synchronous injection means for executing the intake-synchronous injection only for a first predetermined time immediately after an engine start;

intake-asynchronous injection means for executing intake-asynchronous injection after the lapse of said first predetermined time; and second intake-synchronous injection means for executing intake-synchronous injection temporarily, in the case where the idling characteristic of the engine indicates the use of heavy fuel, before the lapse of a second predetermined time after the lapse of said first predetermined time.

16. An engine control apparatus according to claim 15, wherein said idling characteristic indicating the use of heavy fuel is such that the engine speed is reduced below a reference engine speed and the reduction of the engine speed increases to at least a predetermined value, or the intake pipe pressure increases to at least a predetermined value and the increase of the intake pipe pressure assumes a predetermined value, before the lapse of said second predetermined time after the lapse of said first predetermined time.

17. An engine control apparatus according to claim 15, further comprising means for detecting the temperature of the engine, wherein said engine temperature detecting means activates said intake-asynchronous injection means when the engine temperature is not lower than a predetermined temperature even within said first predetermined time immediately after an engine start.

18. An engine control apparatus according to claim 15, wherein said second intake-synchronous injection means is switched to said intake-asynchronous injection means when the operation time of said second intake-synchronous injection means exceeds a third predetermined time.

19. An engine control apparatus according to claim 18, wherein said second intake-synchronous injection means is switched to said intake-asynchronous injection means when the engine is restored to a stable idle state even in the case where the operation time of said second intake-synchronous injection means is within said third predetermined time.

20. An engine control apparatus according to claim 15, further comprising means for detecting the neutral position of the transmission, wherein said second intake-synchronous injection means operates only when said transmission is in the neutral position.

21. An engine control apparatus according to claim 15, further comprising means for detecting the intake air amount, wherein said second intake-synchronous injection means operates only when the intake air amount is lower than a reference value.

22. An engine control apparatus according to claim 15, wherein said second intake-synchronous injection means is switched to the intake-asynchronous injection means in the case where the engine temperature detected by said engine temperature detection means exceeds another predetermined temperature higher than said first predetermined temperature even before the operation time of said second intake-synchronous injection means exceeds said third predetermined time.

23. A control apparatus for an internal combustion engine intended to assure an idle stability immediately after a cold engine start, including means for measuring the time elapsed after an engine start, means for detecting the idle stability after an engine start, and means for controlling the ignition timing of the engine, wherein said ignition timing control means comprising:

first ignition timing advancing means for advancing the ignition timing during a first predetermined time immediately after an engine start;

first ignition timing restoration means for switching the ignition timing to a base ignition timing after the lapse of said first predetermined time; and second ignition time advancing means for advancing the ignition timing temporarily from said base ignition timing in the case where the idle stability of the engine is deteriorated before the lapse of said second predetermined time after the lapse of said first predetermined time.

24. An engine control apparatus according to claim 23, further comprising means for detecting the engine speed, wherein said idle stability detection means determines that the idle stability of the engine is deteriorated in the case where the engine speed is reduced below a reference engine speed.

25. An engine control apparatus according to claim 23, further comprising engine speed detection means, wherein said idle stability detection means determines that the idle stability of the engine is deteriorated in the case where the engine speed is reduced by at least a predetermined value.

26. An engine control apparatus according to claim 23, further comprising means for detecting the intake pipe pressure of the engine, wherein said idle stability detection means determines that the idle stability of the engine is deteriorated in the case where the intake pipe pressure is not less than a predetermined value.

27. An engine control apparatus according to claim 23, further comprising means for detecting the intake pipe pressure of the engine, wherein said idle stability detection means determines that the idle stability of the engine is deteriorated in the case where the intake pipe pressure increases by at least a predetermined value.

28. An engine control apparatus according to claim 23, further comprising means for detecting the engine temperature, wherein said first intake-synchronous injection means activates said intake-asynchronous injection means when the engine temperature is not lower than a predetermined temperature even within said first predetermined time immediately after an engine start.

29. An engine control apparatus according to claim 23, wherein said second intake-synchronous injection means is switched to said intake-asynchronous injection means in the case where the operation time of said second intake-synchronous injection means exceeds a third predetermined time.

30. An engine control apparatus according to claim 29, wherein said second intake-synchronous injection means is switched to said intake-asynchronous injection means in the case where the engine is restored to stable idle state even in the case where the operation time of said second intake-synchronous injection means is within said third predetermined time.

31. A control apparatus for an internal combustion engine intended to assure an idle stability immediately after a cold engine start, including means for measuring the time elapsed after an engine start, means for detecting the idle stability after an engine start, means for controlling the ignition timing of the engine and means for controlling the fuel injection amount:

wherein said ignition timing control means includes means for advancing the ignition timing during a first predetermined time immediately after an engine start, and means for switching said ignition timing to the base ignition timing after the lapse of said first predetermined time, and wherein said fuel injection amount control means includes fuel amount increasing means for setting the fuel injection amount upward temporarily in the case where the idle stability of the engine is deteriorated before the lapse of a second predetermined time after the lapse of said first predetermined time.

32. An engine control apparatus according to claim 31, further comprising means for detecting the engine speed, wherein said idle stability detection means determines that the idle stability of the engine is deteriorated in the case where the engine speed is reduced below a reference engine speed.

33. An engine control apparatus according to claim 31, further comprising engine speed detection means, wherein said idle stability detection means determines that the idle stability of the engine is deteriorated in the case where the engine speed is reduced by at least a predetermined value.

34. An engine control apparatus according to claim 31, further comprising means for detecting the intake pipe pressure of the engine, wherein said idle stability detection means determines that the idle stability of the engine is deteriorated in the case where the intake pipe pressure is not less than a predetermined value.

35. An engine control apparatus according to claim 31, further comprising means for detecting the intake pipe pressure of the engine, wherein said idle stability detection means determines that the idle stability of the engine is deteriorated in the case where the intake pipe pressure increases by at least a predetermined value.

36. An engine control apparatus according to claim 31, further comprising means for detecting the engine temperature, wherein said first intake-synchronous injection means activates said intake-asynchronous injection means when the engine temperature is not lower than a predetermined temperature even within said first predetermined time immediately after an engine start.

37. An engine control apparatus according to claim 31, wherein said second intake-synchronous injection means is switched to said intake-asynchronous injection means in the case where the operation time of said second intake-synchronous injection means exceeds a third predetermined time.

38. An engine control apparatus according to claim 37, wherein said second intake-synchronous injection means is switched to said intake-asynchronous injection means in the case where the engine is restored to stable idle state even in the case where the operation time of said second intake-synchronous injection means is within said third predetermined time.

39. A control apparatus for an internal combustion engine intended to assure an idle stability immediately after a cold engine start, including means for measuring the time elapsed after an engine start, means for storing the idling characteristics after a cold engine start for the light fuel and the heavy fuel supplied to the engine, and means for controlling the ignition timing of the engine, wherein said ignition timing control means comprising:

first ignition timing advancing means for advancing the ignition timing during a first predetermined time immediately after an engine start;

first ignition timing restoration means for switching said ignition timing to the base ignition timing after the lapse of said first predetermined time; and second ignition timing advancing means for advancing the ignition timing temporarily from the base ignition timing in the case where the idling characteristic of the engine indicates the heavy fuel before the lapse of a second predetermined time after the lapse of said first predetermined time.

40. An engine control apparatus according to claim 39, wherein said idling characteristic for the heavy fuel is such that the engine speed is reduced below a reference engine speed by not less than a predetermined amount before the lapse of said second predetermined time after the lapse of said first predetermined time or such that the intake pipe pressure is increased to at least a predetermined value by a predetermined amount.

41. An engine control apparatus according to claim 39, further comprising means for detecting the engine temperature, wherein said first intake-synchronous injection means activates said intake-asynchronous injection means when the engine temperature is not lower than a predetermined temperature even within said first predetermined time immediately after an engine start.

42. An engine control apparatus according to claim 39, wherein said second intake-synchronous injection means is switched to said intake-asynchronous injection means in the case where the operation time of said second intake-synchronous injection means exceeds a third predetermined time.

43. An engine control apparatus according to claim 42, wherein said second intake-synchronous injection means is switched to said intake-asynchronous injection means in the case where the engine is restored to stable idle state even in the case where the operation time of said second intake-synchronous injection means is within said third predetermined time.

44. A control apparatus for an internal combustion engine intended to assure an idle stability immediately after a cold engine start, including means for measuring the time elapsed after an engine start, means for storing the idling characteristics after a cold engine start for the light fuel and the heavy fuel supplied to the engine, means for controlling the ignition timing of the engine, and means for controlling the fuel injection amount, wherein said ignition timing control means includes means for advancing the ignition timing during a first predetermined time immediately after an engine start, and ignition timing restoration means for switching the ignition timing to the base ignition timing after the lapse of said first predetermined time, and wherein said fuel injection amount control means includes fuel amount increasing means for setting the fuel injection amount upward temporarily in the case where the idling characteristic indicates the heavy fuel before the lapse of a second predetermined time after the lapse of said first predetermined time.

45. An engine control apparatus according to claim 44, wherein said idling characteristic for the heavy fuel is such that the engine speed is reduced below a reference engine speed by not less than a predetermined amount before the lapse of said second predetermined time after the lapse of said first predetermined time or such that the intake pipe pressure is increased to at least a predetermined value by a predetermined amount.

46. An engine control apparatus according to claim 44, further comprising means for detecting the engine temperature, wherein said first intake-synchronous injection means activates said intake-asynchronous injection means when the engine temperature is not lower than a predetermined temperature even within said first predetermined time immediately after an engine start.

47. An engine control apparatus according to claim 44, wherein said second intake-synchronous injection means is switched to said intake-asynchronous injection means in the case where the operation time of said second intake-synchronous injection means exceeds a third predetermined time.

48. An engine control apparatus according to claim 47, wherein said second intake-synchronous injection means is switched to said intake-asynchronous injection means in the case where the engine is restored to stable idle state even in the case where the operation time of said second intake-synchronous injection means is within said third predetermined time.

* * * * *